United States Patent
Swartz et al.

(10) Patent No.: US 6,330,244 B1
(45) Date of Patent: Dec. 11, 2001

(54) SYSTEM FOR DIGITAL RADIO COMMUNICATION BETWEEN A WIRELESS LAN AND A PBX

(76) Inventors: Jerome Swartz, 199 Old Field Rd., Old Field, NY (US) 11733; Fred P. Heiman, 16500 Wood Acres Rd., Los Gatos, CA (US) 95030; Daniel R. McGlynn, 266 76th St., Brooklyn, NY (US) 11209; Robert Beach, 1850 Middleton Ave., Los Altos, CA (US) 94204

( * ) Notice: Subject to any disclaimer, the term of this patent is extended or adjusted under 35 U.S.C. 154(b) by 0 days.

(21) Appl. No.: 09/008,710

(22) Filed: Jan. 16, 1998

Related U.S. Application Data

(63) Continuation-in-part of application No. 08/866,690, filed on May 30, 1997, which is a continuation-in-part of application No. 08/780,023, filed on Dec. 20, 1996, which is a continuation-in-part of application No. 08/706,579, filed on Sep. 5, 1996.

(51) Int. Cl.[7] .............................. H04Q 7/00; H04Q 7/24; H04Q 7/20; H04J 3/24; H04M 1/00
(52) U.S. Cl. ..................... 370/401; 370/329; 370/338; 370/349; 455/432; 455/434; 455/554
(58) Field of Search .................................. 370/401, 329, 370/338, 349, 913, 400, 311; 455/432, 434, 435, 553, 554, 555; 379/58, 59, 60, 265, 266

(56) References Cited

U.S. PATENT DOCUMENTS

| | | | |
|---|---|---|---|
| 5,159,592 | * 10/1992 | Perkins | 370/85.7 |
| 5,572,528 | * 11/1996 | Shuen | 370/85.13 |
| 5,636,220 | * 6/1997 | Vook et al. | 370/338 |
| 5,654,959 | * 8/1997 | Baker et al. | 370/331 |
| 5,742,596 | * 4/1998 | Baratz et al. | 370/356 |
| 5,781,612 | * 7/1998 | Choi et al. | 379/58 |
| 5,796,727 | * 8/1998 | Harrison et al. | 370/338 |
| 5,911,123 | * 6/1999 | Shaffer et al. | 455/554 |
| 5,913,176 | * 6/1999 | Barabash | 455/560 |
| 5,953,663 | * 9/1999 | Maupin et al. | 455/433 |
| 5,960,073 | * 9/1999 | Kikinis et al. | 379/265 |
| 5,960,344 | * 9/1999 | Mahany | 455/432 |
| 6,078,805 | * 6/2000 | Scott | 455/406 |

* cited by examiner

Primary Examiner—Wellington Chin
Assistant Examiner—M. Phan
(74) Attorney, Agent, or Firm—Baker Botts LLP

(57) ABSTRACT

A wireless local area network for digital radio communication between remote devices and a PBX telephone system, wherein the remote devices can access and use the voice message features in the PBX and the data bases on a host computer and servers. A wireless phone is provided for voice and data communication through the PBX or a CO telephone line with remote locations or the Internet using digital data packets and standard Internet Protocol. In a preferred embodiment of the invention, the remote device is a cash register comprising a bar code scanner and a phone. Radio communication between the register and a host computer is carried out over two channels, a first channel for data communication and a second channel for voice communication.

7 Claims, 19 Drawing Sheets

SYSTEM FOR DIGITAL RADIO COMMUNICATION BETWEEN A WIRELESS LAN AND A PBX

RELATED APPLICATIONS

This application is a continuation-in-part of U.S. patent application Ser. No. 08/866,690, entitled "PORTABLE SHOPPING AND ORDER FULFILLMENT system" filed on May 30, 1997, currently pending, which is a continuation-in-part of U.S. patent application Ser. No. 08/780,023 entitled "INTRANET SCANNING TERMINAL SYSTEM" filed on Dec. 20, 1996, currently pending, which is a continuation in part of U.S. patent application Ser. No. 08/706,579 entitled "DEVICE AND METHOD FOR SECURE DATA UPDATES IN A SELF-CHECKOUT SYSTEM" filed on Sep. 5, 1996, currently pending.

FIELD OF USE

This invention relates generally to an improved data communication system. More specifically, this invention relates to an improved system for wireless digital data communication between a local area network ("LAN") and a Private Branch Exchange ("PBX") telephone system. More specifically, this invention provides a system for connecting wireless digital devices to a PBX via an Ethernet in order to access the voice messaging features of the PBX.

BACKGROUND OF THE INVENTION

Wireless LANs have been developed and are now used in offices, retail stores and large industrial facilities, such as warehouses and factories. These LANs provide data communication between computers, printers, servers and other devices without the trouble and expense of installing wires and cables. In addition to data communication, some LANs provide voice communication between devices on the LAN. Systems are also available that permit the LAN to communicate with a remote device using a telephone connection.

A problem with telephone communication from a LAN is the limited functionality of the phone. A LAN phone does not provide the voice mail, caller ID and other functionality of a PBX system that have become indispensable to users of office telephone systems. Thus, because of the limited functionality of a LAN phone system, another telephone system such as a PBX is required.

SUMMARY OF THE INVENTION

It is an object of the present invention to provide an improved data communication system for connecting a wireless LAN or WAN to a PBX.

It is a further object of the present invention to provide a method for data communication between a Host Interface Unit (HIU) for a wireless LAN or WAN and an ISP (Internet Service Provider).

It is also an object of the present invention to provide improved access to generally available multi-media data files by communicating with the Internet via a wireless portable terminal.

Another object of the present invention is to provide an improved HIU for a wireless LAN or WAN to route data between a PBX and a wireless portable terminal.

It is a further object of the present invention to provide an improved HIU for a wireless LAN or WAN to act as an Ethernet bridge to route communication data between an ISP and a wireless portable terminal.

It is also an object of this invention to provide a wireless LAN or WAN connected through an access point to a HIU connected to a PBX on a Token Ring network.

It is another object of the present invention to provide a digital phone integrated with a cash register and sharing the radio communication between the register and a HIU.

It is a still further object of the present invention to provide a wireless portable terminal that uses a single processor to perform dedicated functions and provide radio communication. The high quality digital signal permits certain data processing functions, such as voice recognition, to be performed by the HIU so that the MU requires only a single processor.

It is a further object of this invention to provide dual data/voice communication between a cash register and a network connected to a PBX or a Central Office line.

In a preferred embodiment of the invention, a mobile unit ("MU") on a LAN is connected via a radio signal to an access point ("AP") that provides an Ethernet connection to a PBX. In a preferred embodiment of the present invention, the MU is a portable terminal having a unique address on the system and is provided with both data and voice transmission channels, This permits the MU to access the voice mail features of the PBX and for the PBX to access data storage devices on the wireless LAN. (For the purposes of this disclosure, the term "mobile unit" refers to any portable or stationary device that transmits data to an AP by digital radio communication.)

In another preferred embodiment of the present invention, a portable terminal having an integrated machine code reader and a radio for communication with an AP connected to a PBX is provided with a display for illustrating help and instructional files associated with an item identified with the machine code reader and for data downloaded from the LAN.

The information accessed through the PBX can be downloaded to the hand-held terminal and presented in any number of forms. The information can include messages from the PBX's voice mail server, e-mail, or data from remote devices. The data can be presented in the form of a still picture, text, audio or as video. The use of standard data protocols such as those used currently on the Internet permit wide area accessibility over commercial and closed communication networks on any number of hardware platforms.

A preferred alternative embodiment of the present invention includes machine readable coded labels having one or more remote file location, such as uniform resource locators ("URLs") used to reference sites on the world wide web. These URLs are used by the portable terminal to retrieve data files from various local and remote addresses available over a wireless communication network. The machine coded labels are preferably encoded with a high-density bar code such as PDF417. These URLs can be presented on the terminal display in the form of a hyperlink which submits a data retrieval request to a remote address upon selection. The displayed hyperlink could be presented on the display as either a direct address (URL) or a highlighted title for the address.

BRIEF DESCRIPTION OF THE DRAWINGS

The present invention will be understood and appreciated more fully from the following detailed description, taken in conjunction with the drawings, in which:

FIGS. 10A, 10B, 10C and 10D are functional block diagrams of a preferred embodiment of a phone and an access point connecting to the bus of a host device.

DETAILED DESCRIPTION OF THE PREFERRED EMBODIMENT

Figure 1:
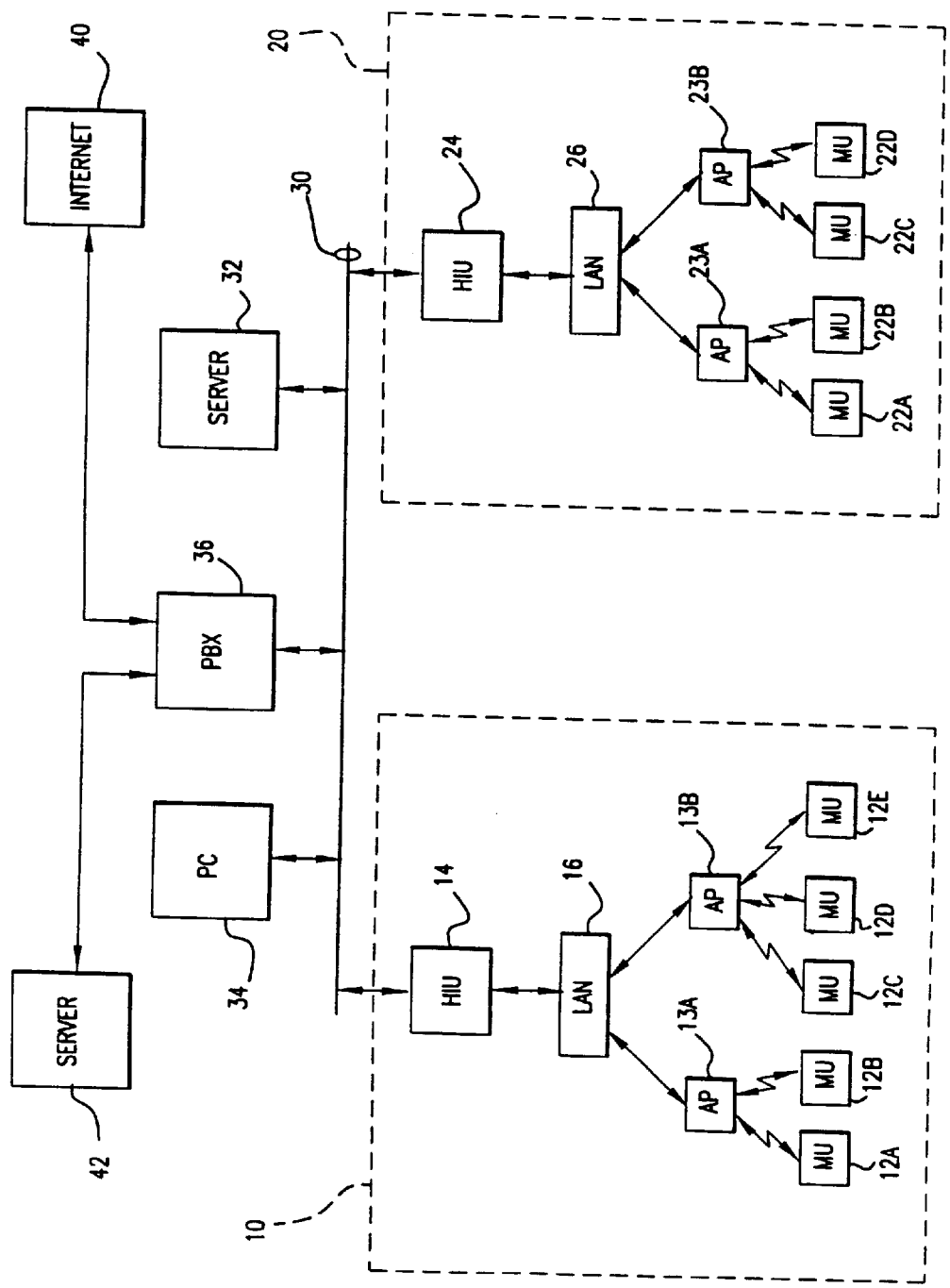
FIG. 1 is a general block diagram of a system employing a preferred embodiment of the present invention.

In the preferred embodiment of the present invention, radio modules are used for digital data communication between MUs and an AP connected to an Ethernet. A PBX is connected to the Ethernet and the MUs can communicate with the PBX either directly or through a HIU which can provide routing or bridging functions. The MU can connect to remote computers or servers through the PBX and can also access the voice mail features of the PBX.

In another preferred embodiment, when a PBX is not available, radio modules connect to a HIU. The HIU has a minimum of two interfaces, one interface is for a phone line connection and the second interface is for one or more radio signals from wireless devices. The HIU can connect to commonly available Central Office ("CO") lines, including but not limited to POTS (Plain Old Telephone Service), ISDN (Integrated Services Digital Network), and T-1 circuits. The HIU uses PIP (Point-to-Point Protocol) to communicate with the Internet or remote computers. The wireless devices can be Mobile Units, such as wireless phones, pagers, notebook computers or a variety of other portable devices provided with a means for radio communication. The stationary devices can be computers, printers, file servers, fax machines, LANs and WANS. The HIU can be provided with additional interfaces for Ethernet ports and jacks for wired "standard" type phones can be added.

The Mobile Units of the present invention employ a wireless digital radio for communicating data to a HIU over a wireless network. The network can be either a local area network, such as Symbol's SPECTRUM24® spread spectrum frequency hopping communication network, or a wide area communication network system, such as those employing a cellular digital packet data (CDPD) communication protocol, or a combination of LAN and WAN systems.

In a preferred embodiment, the AP connects to an Ethernet and computing and data storage functions are preformed by a computer or server on the Ethernet, thereby reducing the computational memory and power requirements of the MU's communicating with the system. When the system does not include a PBX, the APs connect to a HIU, which is preferably connected to other remote networks through high speed communication links such as commercially available T1, T2 or T3 type telephone connections. Through such connections, the HIU may communicate with third party servers employing standard TCP/IP and other standardized communication protocols to transmit/retrieve data.

In one of the preferred embodiments, the MU is a portable terminal having an integrated machine code reader. Although the system will be described in terms of a portable terminal employing an integrated bar code laser scanner, it will be understood by those skilled in the art that the machine code reader can be a radio frequency identification tag reader, a CCD bar code reader having imaging capabilities for recording images or any other type of machine code reader which can decode encoded indicia on an article. Data collected with the portable terminal is communicated to a HIU.

The present invention will be described in terms of an improved data communication system for connecting a wireless LAN or WAN to a PBX or a CO line. However, as noted above, it will be understood by those skilled in the art that the present invention may be utilized in any environment in which data is communicated by radio from a remote device to an AP on an Ethernet.

In the preferred embodiment illustrated in FIG. 1, MU's 12A–E in location 10 communicate to a HIU 14 through multi-access points 13A and 13B. As described above, the MU's communicate in the LAN 10 with a SPECTRUM24® network. The network provides a transparent wireless connection to an Ethernet LAN 16 through multiple access points 13A and 13B. Preferably, each of the access points is compatible with the Simple Network Management Protocol (SNMP).

SPECTRUM24® employs a frequency hopping modulation technique that offers a high-capacity network by using multiple access points which may be connected to an existing wired LAN backbone. The system employs more than 70 non-overlapping frequencies which minimize the probability that one cell will operate on the same frequency at the same time as another cell. The system is designed to work in the 2 to 2.5 Ghz frequency band.

Data collected by the HIU 14 through the Ethernet LAN backbone 16 (FIG. 1) is processed locally. To the extent the received data requires a response, the HIU 14 retrieves data, processes information and retransmits data to the MU. In the event the MU's request should require the retrieval of data not stored on the HIU 14, the HIU 14 can retrieve data from external sources such as network ID or IP addressable server 32 and PC 34 through an Ethernet connection to a PBX 36 on a WAN. The MU can also be used to transmit data to other devices on the LAN. When the MU is provided with a voice communication channel, it can be used as a telephone to communicate with other MUs on the LAN, or to remote locations through the PBX 36. The PBX 36 also provides communication between a MU 12A–E, 22A–D and remote devices connected over a telephone line, such as the Internet 40 or a server 42.

The HIU 14 may also use the wide area communication network 30 to communicate data to another host 24 at a related site 20. The two sites could also be linked to provide pass through communication between a MU 12A located in site 10 and an MU 22A located at site 20.

In a preferred embodiment of the present invention HIU 14 and HIU 24 communicate data over the wide area network 30 with open standard protocols and data types such as that used by an Internet server. Such a system permits HIU 14 to retrieve and utilize data from servers without complex data conversion and translation routines. In a preferred embodiment, the open architecture standard is also designed into the MUs so that data files can be transparently retrieved by the MUs 12A–E through the HIU 14. With respect to sensitive and confidential data, it is preferred that the systems employ encryption technology or use a secure closed communication link.

The Portable Terminal

Figure 2:
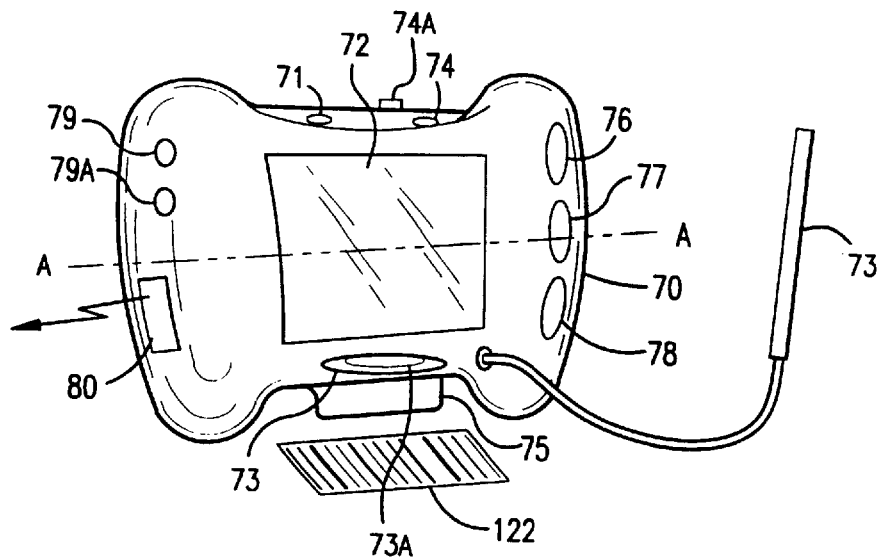
FIG. 2 is a preferred embodiment of a portable terminal of the present invention.

FIG. 2 illustrates a preferred embodiment of the present invention, wherein the MU is a portable terminal. The terminal 70 is provided with a display 72. The display is preferably a CGA or VGA type video display having a touch sensitive surface. The display will function both as a video display and a data input device. The terminal 70 can also be provided with a pen 73 which can be used to actuate the touch screen 72 or an auto identification bar code reading device.

In a preferred embodiment, the terminal 70 is also provided with a limited number of activation buttons 76, 77 and 78 for performing various user functions. The key functions can be defined on the screen of a touch sensitive scanner.

In a preferred embodiment of the present invention, the terminal 70 is provided with a voice communication system including a microphone 71 and a speaker 74. In an alternative embodiment, a connection port 74A for a headset is provided. This voice communication system may be used as a telephone or to receive voice mail messages and audio data broadcast by the HIU. Video messages may also be transmitted to the video display 72. In addition, the voice system on the portable terminal may also be used to provide voice activated control commands on the portable terminal.

Collection of data is preferably performed by a bar code scanner in the pen 73 or integrally mounted scanner 75. The scanner reads one and two dimensional bar codes such as the ubiquitous UPC code and PDF 417 code. In an alternative embodiment of the present invention, the scanner is detachable from the terminal and is provided with either a short range radio link and its own battery supply or a wired connection.

The portable terminal 70 communicates with a PBX via the AP on the Ethernet or with a HIU through a wireless radio 80. In a preferred embodiment of the present invention, the radio 80 is a Symbol SPECTRUM24® PCM-CIA Type II card communicating over a local area network employing a frequency-hopping communication system conforming to IEEE P802.11-1997. The standard is available from IEEE Standards Department, 445 Hoes Lane, P.O. Box 13311, Piscataway, N.J. 08855-1331. The standard is incorporated herein by reference and shall not be further discussed. The system employs data throughput of at least one mega bit per second. Depending on the volume of data being transmitted, discrete communication systems such as SPECTRUM ONE®, also available from Symbol Technologies, Inc., may also be used. Moreover, many other frequency bands and data encoding schemes which provide adequate bandwidth and security can be employed.

The ergonomic design of the portable terminal shown in FIG. 2 permits the terminal to be used in either a horizontal configuration along line A—A, or in a vertical configuration relative to line A—A. The terminal is provided with a reconfiguration key setting which permits the video system to automatically reconfigure its display to reflect the user's preference. The reconfiguration key 79A will automatically reconfigure the video display to change the display configuration from the first configuration, e.g., landscape, to a second configuration, e.g., portrait. The reconfiguration function permits a facility to connect the portable terminal to a fixed station in more than one arrangement.

Figure 3:
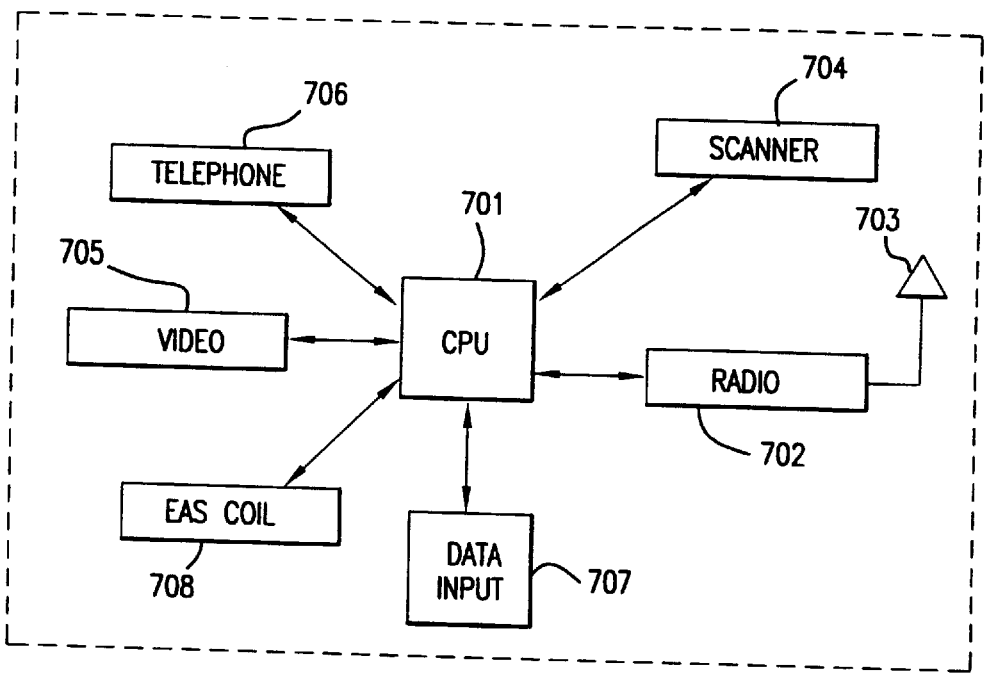
FIG. 3 is a functional block diagram of the basic subcomponents of a preferred embodiment of a portable terminal of the present invention.

FIG. 3 illustrates the basic subcomponent systems of the portable terminal shown in FIG. 2. As shown, the system 70 includes a CPU 701 which communicates with a radio 702, having antenna 703 a scanning subsystem 704, a video subsystem 705, a telephone subsystem 706, a data input device 707, and an EAS tag activation/deactivation circuit 708.

Figure 4:
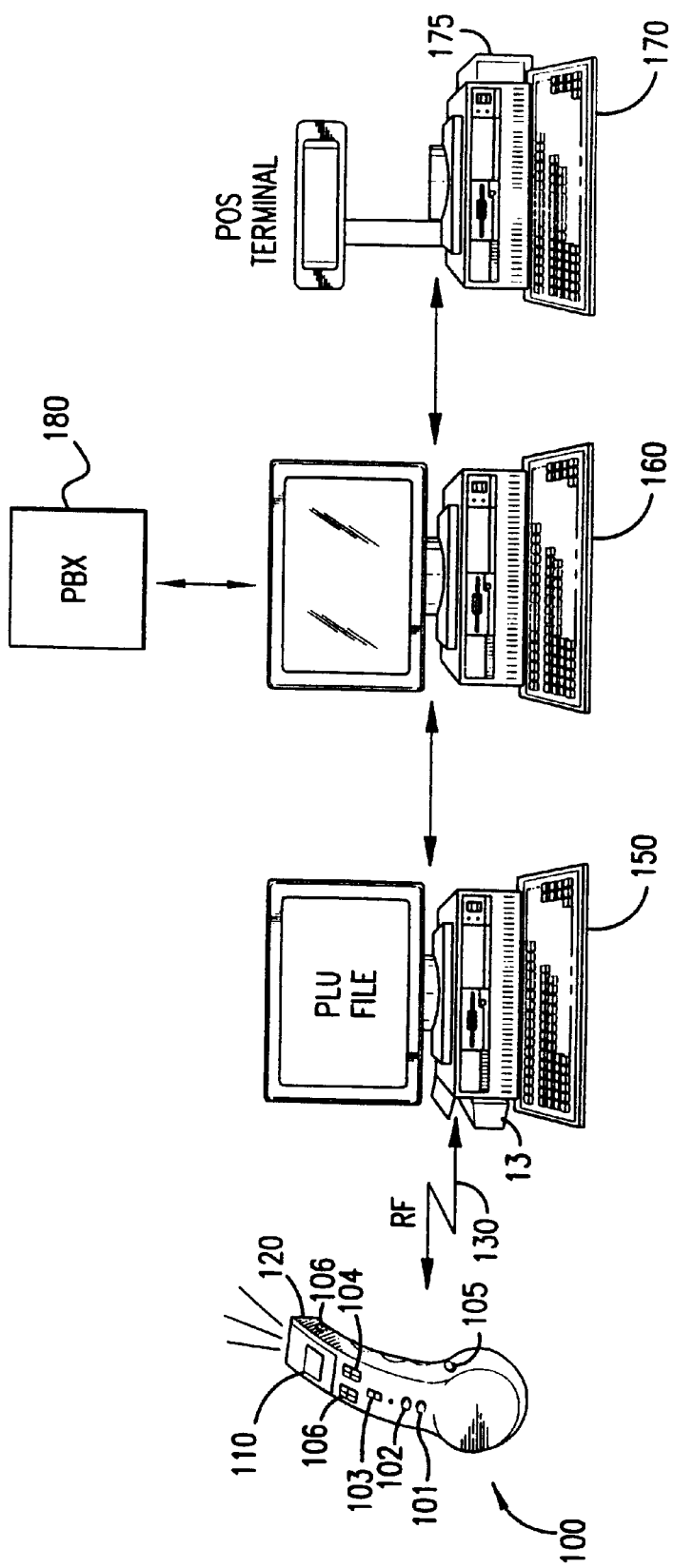
FIG. 4 is an alternative preferred embodiment of the present invention used in a self-scanning application.
Figure 5:
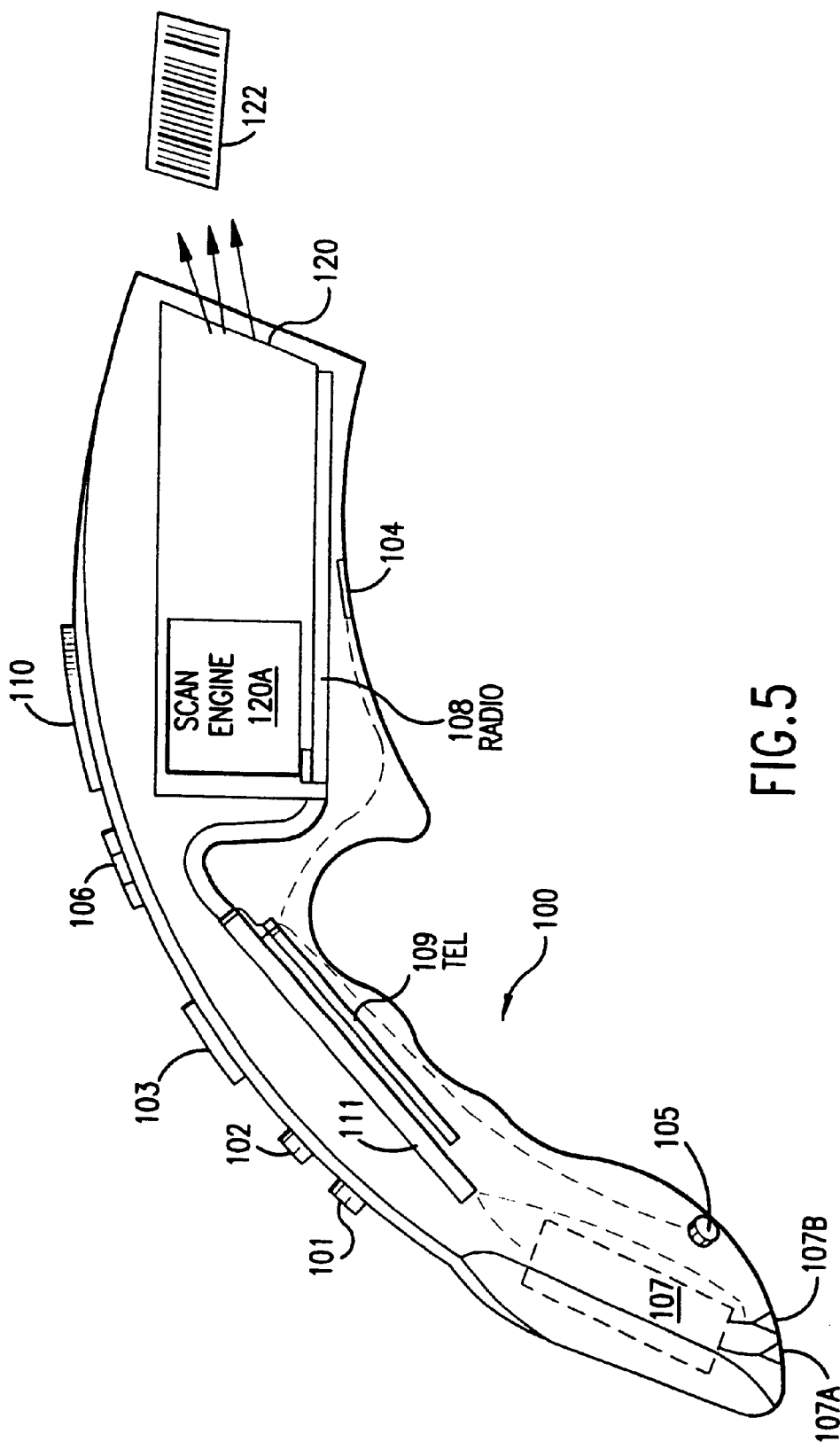
FIG. 5 is a cross-sectional view of the portable terminal illustrated in FIG. 4.

FIGS. 4 and 5 illustrate an alternative embodiment of a portable terminal of the present invention. In FIG. 4, terminal 100 is provided with a display 110. The display is a partial CGA, VGA or super VGA display having a multi-contact navigational pad 106 for scrolling through the full video image. In addition, the terminal 100 is also provided with a scanner 120 for reading bar code labels 122, three input buttons 101, 102 and 103, a speaker 104 and a microphone 105. The portable terminal 100 is equipped with a radio 108 and a rechargeable battery 107 inside the casing, shown in FIG. 5. Also shown in FIG. 5 are the main circuit board 111, the scan engine 120A, and battery recharging terminals 107A and 107B which are connected to a recharging circuit (not shown). A separate circuit board 109 is also shown for the optional telephony application. A battery overcharge protector circuit is also included but not shown.

Figure 6A:
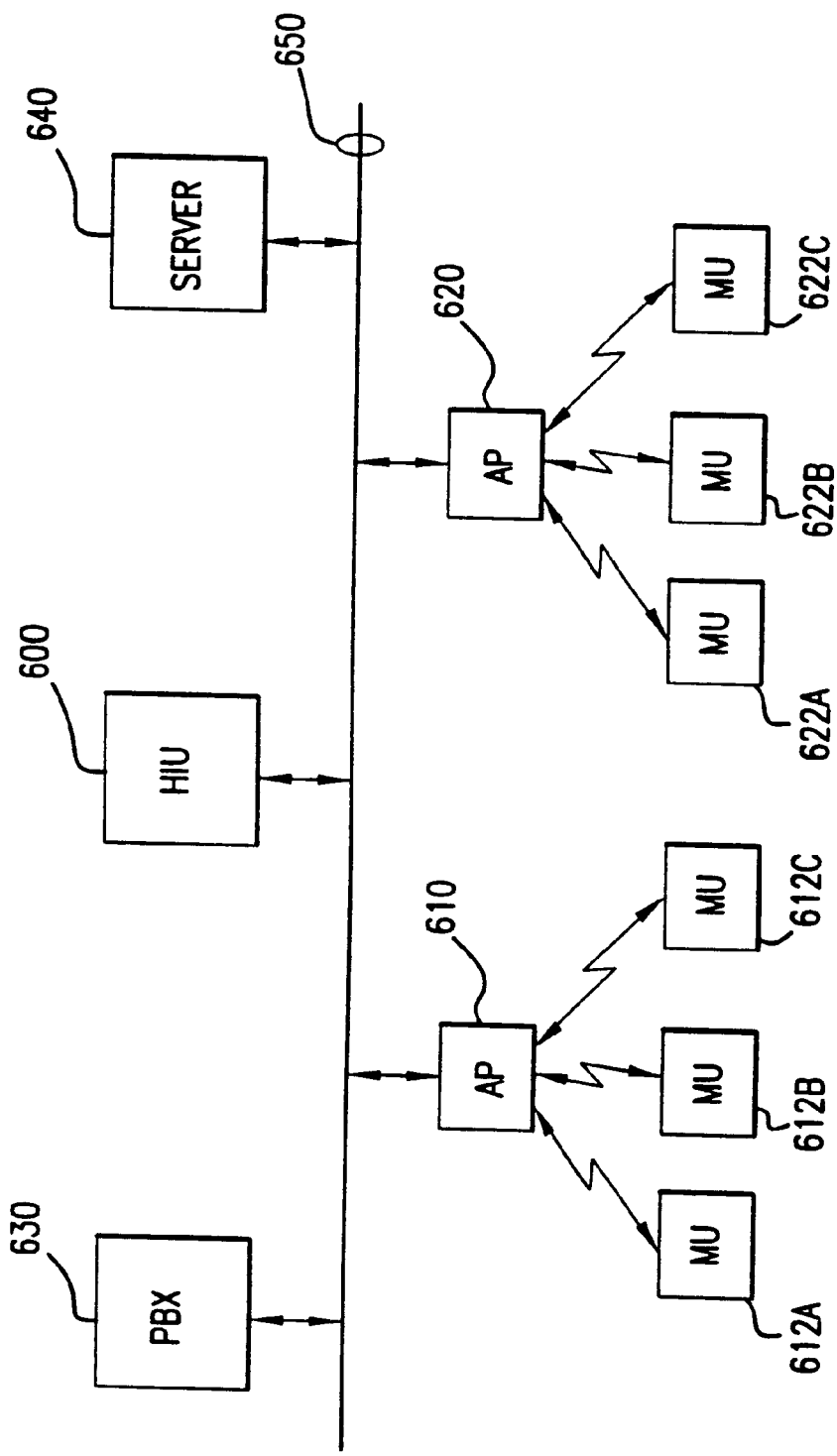
FIGS. 6A, 6B, 6C and 6D are various configurations of the system of the present invention.
Figure 6B:
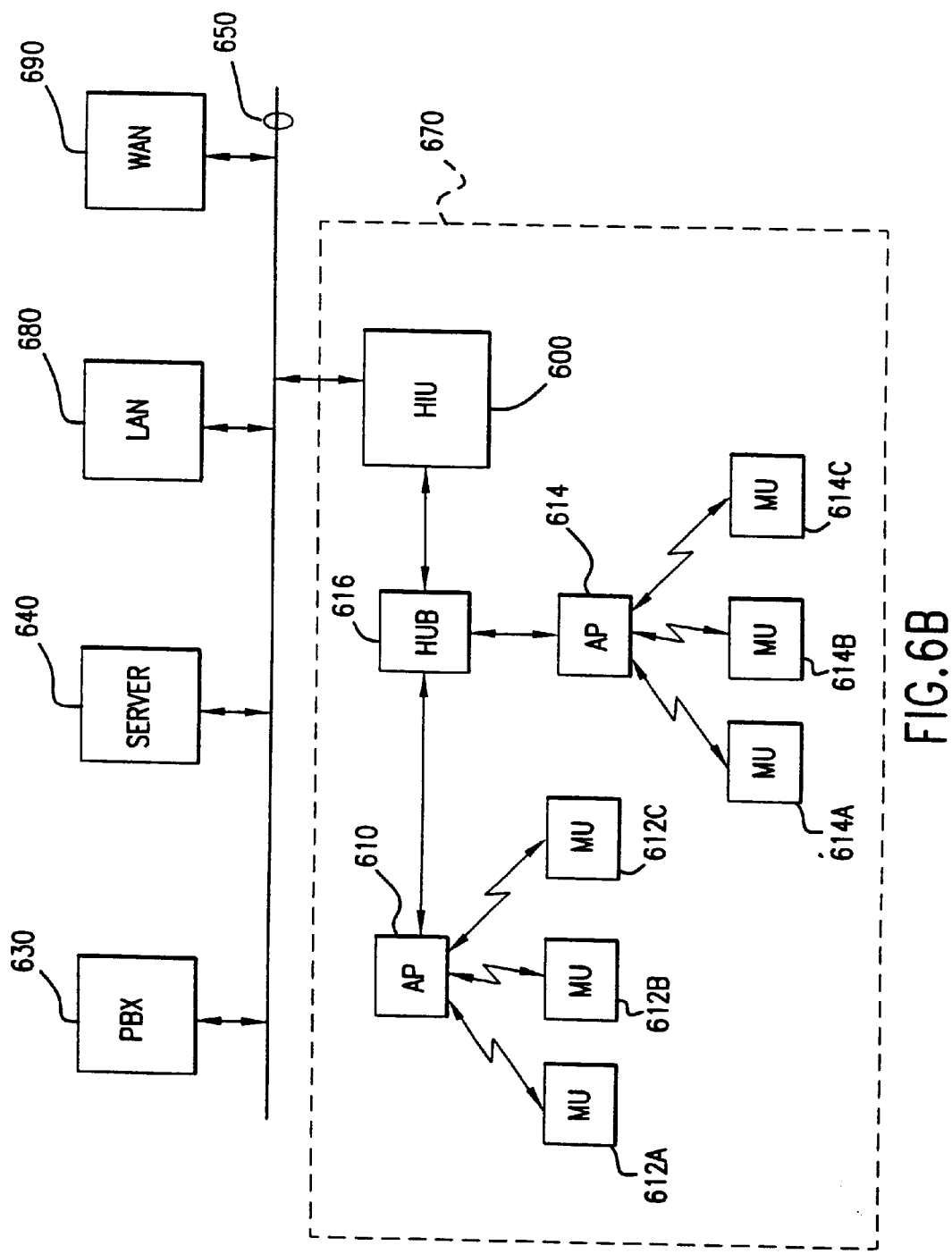
Figure 6C:
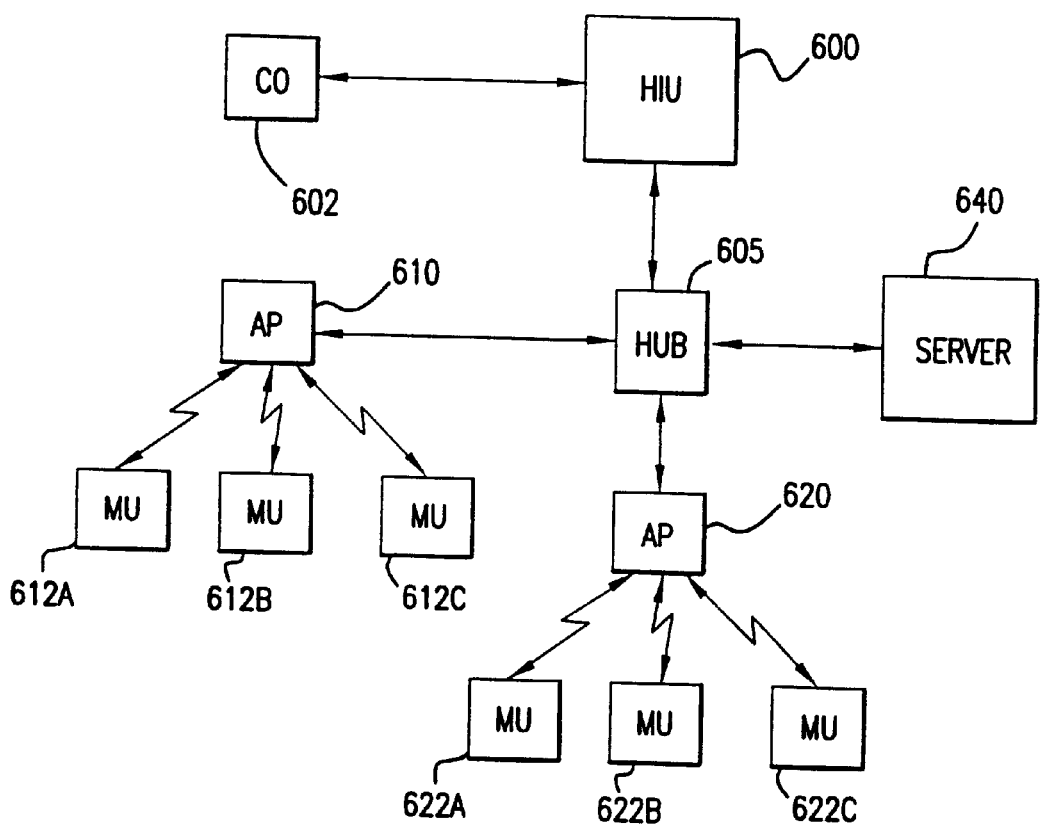
Figure 6D:
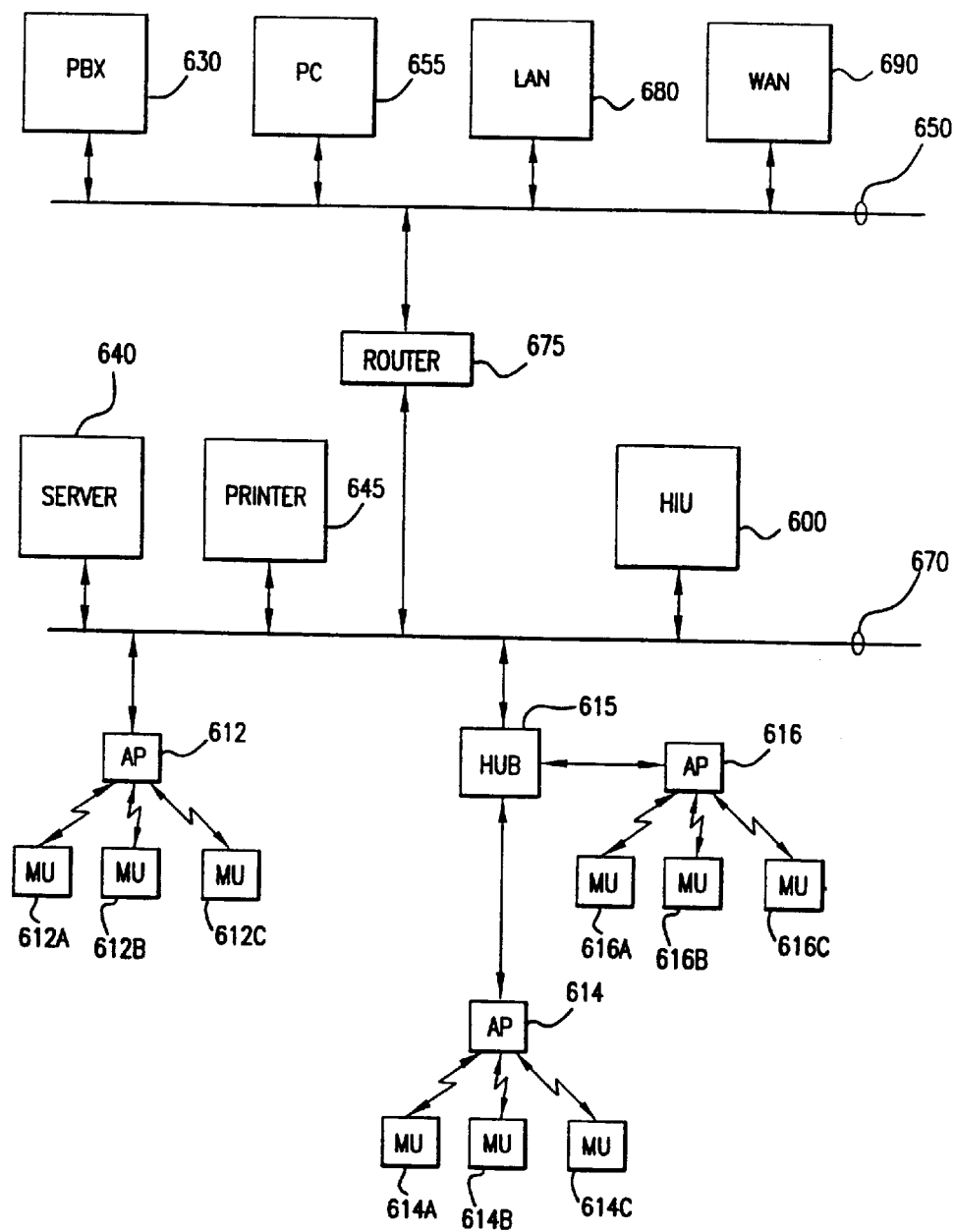
Figure 6E:
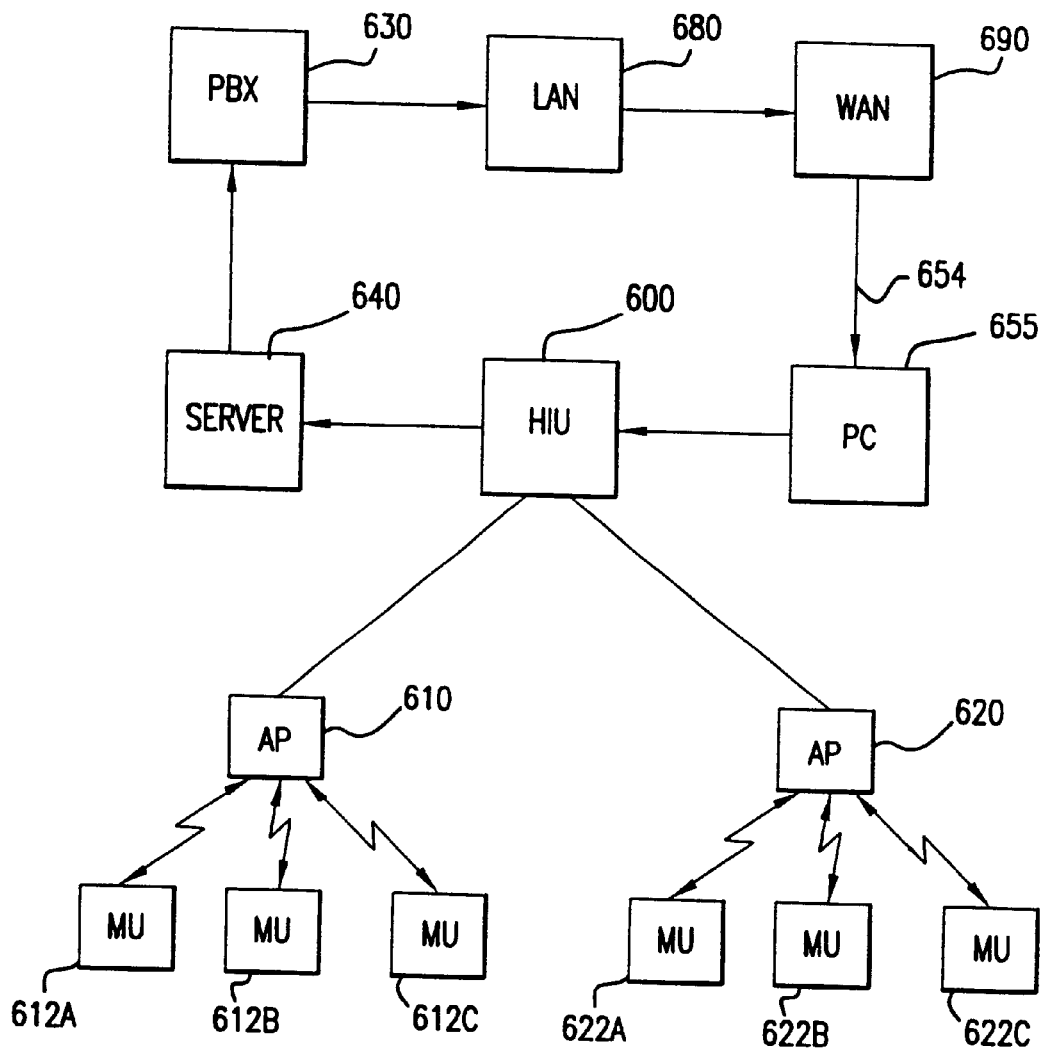

FIGS. 6A, 6B, 6C, 6D and 6E illustrate various components of a system employing different configurations of preferred embodiments of the present invention. FIGS. 6A, 6B, 6C and 6D show the MUs connecting to an Ethernet through APs. FIG. 6E shows the MUs connecting to a Token Ring network through APs. The APs provide access to the Ethernet or Token Ring network and each AP can simultaneously accept up to twenty-five radio signals. The network can be part of a local or wide area network that includes a PBX 630, or the APs can be connected to a HIU 600 that connects to a network comprising a PBX 630. When the APs connect to the HIU 600, the HIU 600 functions as a bridge or router for communications between the APs and the PBX 630.

System Configuration

FIG. 6A shows a system wherein the APs 610, 620 for the MUs 612 A–C, 622 A–C, the HIU 600 and a server 640 are connected to the same Ethernet backbone. Communication from the MUs 612 A–C, 622 A–C can go directly to the PBX 630 or to one of the other devices on the Ethernet. Data can be processed in the HIU 600 or accessed from the server 640. Phone communications can be established with other devices in the network, such as between two MUs 612A and 622A, without going through the PBX 630.

FIG. 6B shows a system wherein a LAN 670 having access points 610, 614 connected via hub 616, is connected to an Ethernet on a WAN 650 through a HIU 600. In this configuration, the HIU 600 provides routing or bridging functions between the LAN 670 and the WAN 650. The PBX 630 is located on the WAN 650 and only communications with devices outside the LAN 670 are passed through the HIU 600 to the WAN 650. In addition to LAN 670, other networks, such as LAN 680 and WAN 690, and devices such as server 640 can be connected to WAN 650 for communication with the PBX 630.

FIG. 6C shows a system wherein a PBX is not used and the HIU 600 provides the interface with a telephone system.

The HIU 600 provides voice mail functions, as well as data storage and processing functions. HIU 600 is connected to access points 610, 620 and server 640 by HUB 605. Telephone communications with outside locations connect with a CO 602 line. The CO 602 can be almost any commercially available system, such as POTS, ISDN or T1. Data can be accessed by the MUs 612A–C, 622A–C from a server 640 in the local network as well as from remote devices accessed over the telephone system.

FIG. 6D shows a system wherein a bridge or router 675 is used to connect a LAN 670 with a WAN 650 that connects to the PBX 630. MUs can communicate with devices in the LAN 670 without connecting to the PBX 630. WAN 650 also connects to PC 655, LAN 680 and further WAN 690. LAN 670 includes server 640, printer 645, HIU 600, access point 612 and hub 615 connected to further access points 614, 616. The router 675 only passes data from the LAN 670 to the WAN 650 when a MU 612A–C, 614A–C, 616A–C on the LAN 670 addresses a device on the WAN 650.

FIG. 6E shows a system wherein a HIU 600 is connected to a Token Ring Network 654. Radio communications with the MUs 612A–C, 622A–C are connected to the HIU 600 through APs 610 and 620. The HIU 600 provides processing, routing and data storage functions for communications with the MUs 612A–C, 622A–C. The MUs 612A–C, 622A–C can also access the other devices on the Token Ring Network 654 through the HIU 600 using the devices' network ID or IP addresses. This allows the MUs 612A–C, 622A–C to connect to a PBX 630 for telephone communications and voice messages and to other devices on the Token Ring Network 654, such as server 640, PC 655, LAN 680 and WAN 690.

As discussed above, in a preferred embodiment of the present invention an MU can be a phone or a pager provided with a high resolution screen for displaying text and graphics, and a two-way radio. In the context of the present invention, these interactive multi-media devices are employed to communicate with devices on the local area network (such as PCs, printers and servers), other users of the system and remote locations through a PBX or CO line. These devices also allow users to access voice messaging systems and provide the same functionality as a standard PBX phone.

In the preferred embodiment of the present invention illustrated in FIG. 4, information is downloaded to the portable terminal 100 over the wireless network 130 by radio communication with access point 13, connected to controller 130. Controller 130 is connected by a wired network to other systems, such as computer 160 and POS terminal 170. Computer 160 provides an interface to PBX 180. The portable terminal is a DOS or Windows operating system having a browser type graphical user interface. Data displayed on the terminal's display will include "links" to other information. If the link is activated by navigation keys 107 (or by touching the selection if using a touch sensitive display pad) the portable terminal will retrieve additional data through the controller 150. Data stored at the controller is downloaded directly to the portable terminal. Alternatively, the "link" represents a data file stored at a remote source such as an Internet connection, in which case the controller 150 sends the request over a wide area network and retrieves the data and routes the data to the portable terminal. The link may also include embedded passwords and data request commands required by the remote server for retrieval of the selected data field.

The structure discussed above permits the use of standard programming tools such as HTML 3.0 for the creation of an Intranet/Internet environment for the operation of the portable terminals 100 and for ease of retrieving and converting data files from external sources for use on the system.

The portable terminals could also be used to download audio data files. This would be especially useful to visually impaired users. Those users who have difficulty reading small print would be able to scan a bar code and receive information through an audio output. In the event a user requires assistance, the portable terminal could also be provided with a working telephone subsystem.

Mobile Units

Each MU is provided with a unique Internet Protocol ("IP") address which can be the same as its network ID address to allow both intranet and internet communication. In a preferred embodiment, a user can access the voice mail features of the PBX by using the buttons on the MU to send commands. In another preferred embodiment, when a user requests information, a command is sent to the HIU controller which forwards the request to the appropriate server or other network device, The information is then transmitted to the MU via the HIU. Although the data is transmitted using packet data communication techniques, the communication networks described above provide for adequate through puts to establish a real time communication link.

Figure 7:
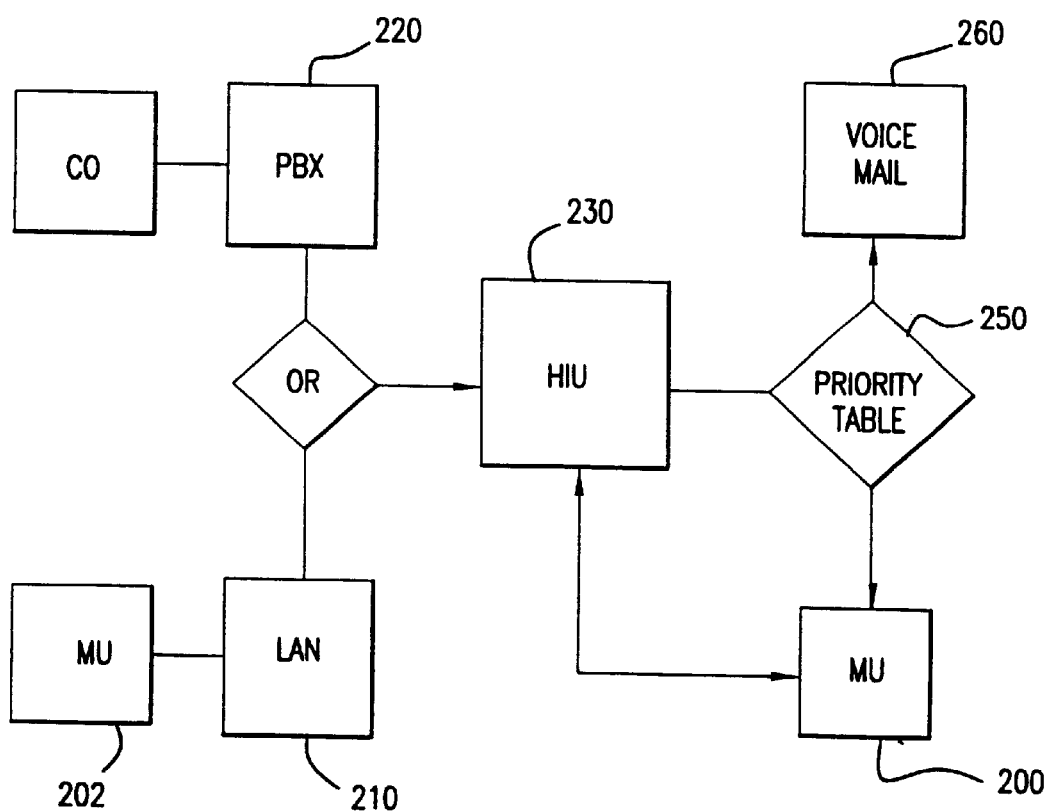
FIG. 7 is a flow chart of a call prioritizing system employing a preferred embodiment of the present invention.

In a preferred embodiment shown in FIG. 7, the MU 200 is used as a telephone to receive calls from another MU 202 in the LAN 210 or through the PBX 220. Using either the caller ID features of the PBX 220 or the ID address from the MU, an incoming caller can be identified. The caller's identity is sent to the HIU 230 and compared with a table 250 of frequent callers that is programmed for each MU user. (In another preferred embodiment, a call is received by the MU directly from either the PBX or another device in the local network and the priority table 250 resides in the memory of the MU's processor.) The table 250 prioritizes the call according to choices made by the user and the call is directed to the MU 200 or a voice mail system 260. The voice mail system 260 can reside in the HIU 230, the PBX 220 or a server on the network. Calls sent to the MU 200 can be further prioritized by assigning distinctive rings to different priority calls. A high priority call would have one type of ring, while a lower priority call would have another type of ring. Voice messages are indicated on the MU 200 by either a flashing light or a message on the display screen. Before accessing the voice messages, the user can press a button on the MU 200 that commands the HIU 230 to display a menu of the messages, showing the callers' names and the time and date when the messages were received. The user can then press a button on the MU 200 and command all of the messages or only selected messages to be played.

The priority table 250 can also include links to data stored in the HIU 230 or in another device on the Ethernet, such as a server. The priority table 250 identifies the caller and if it is a priority call, the call is sent directly to the MU 200 and actuates a distinctive ring based on the caller's assigned priority level. At the same time, the MU's screen displays a listing the caller's name and pertinent information relating to the caller, such as his affiliation and title. If the user requires additional information, he can press a button and the screen will display a menu of additional information that the user can access. Such information can include product inventory, order status, accounts payable and receivable, meeting notes, records of previous conversations with the caller and personal information about the caller, such as the names of the caller's family members.

In order to provide hands-free operation of the MU, the MU can be provided with a port for a microphone and a port for a receiver or a single port that combines both functions. This permits the user to carry on a conversation with a caller while viewing the MU's screen and pressing buttons on the MU to access data from remote files.

When an MU is configured for voice communication, it can access all of the features of the PBX's voice mail system. The user can receive messages, skip messages, delete or save messages, record a new announcement or message, forward calls to another location, change the address of his location, schedule message reminders, and broadcast messages over the network. The user can also use the on-line directory system in the PBX to connect to another user through a PBX extension or over the LAN.

Voice recognition by a computer requires a high quality voice signal and a substantial amount of processing capacity to perform the digital conversion and voice identification. Digital radio communication provides a high quality voice signal that is not available with an analog radio signal. The high quality digital radio signal permits voice recognition processing functions to be shifted from the MU's processor to the HIU or another device on the receiving end that has greater processing capacity. The present invention allows the MU user to use a voice processing system as a security check for sensitive files stored on remote devices or to dictate letters or messages that will be saved as a text file. Through an MU, a user can dictate and send e-mail from remote locations or prepare letters using the system when he does not have access to a keyboard.

Figure 8A:
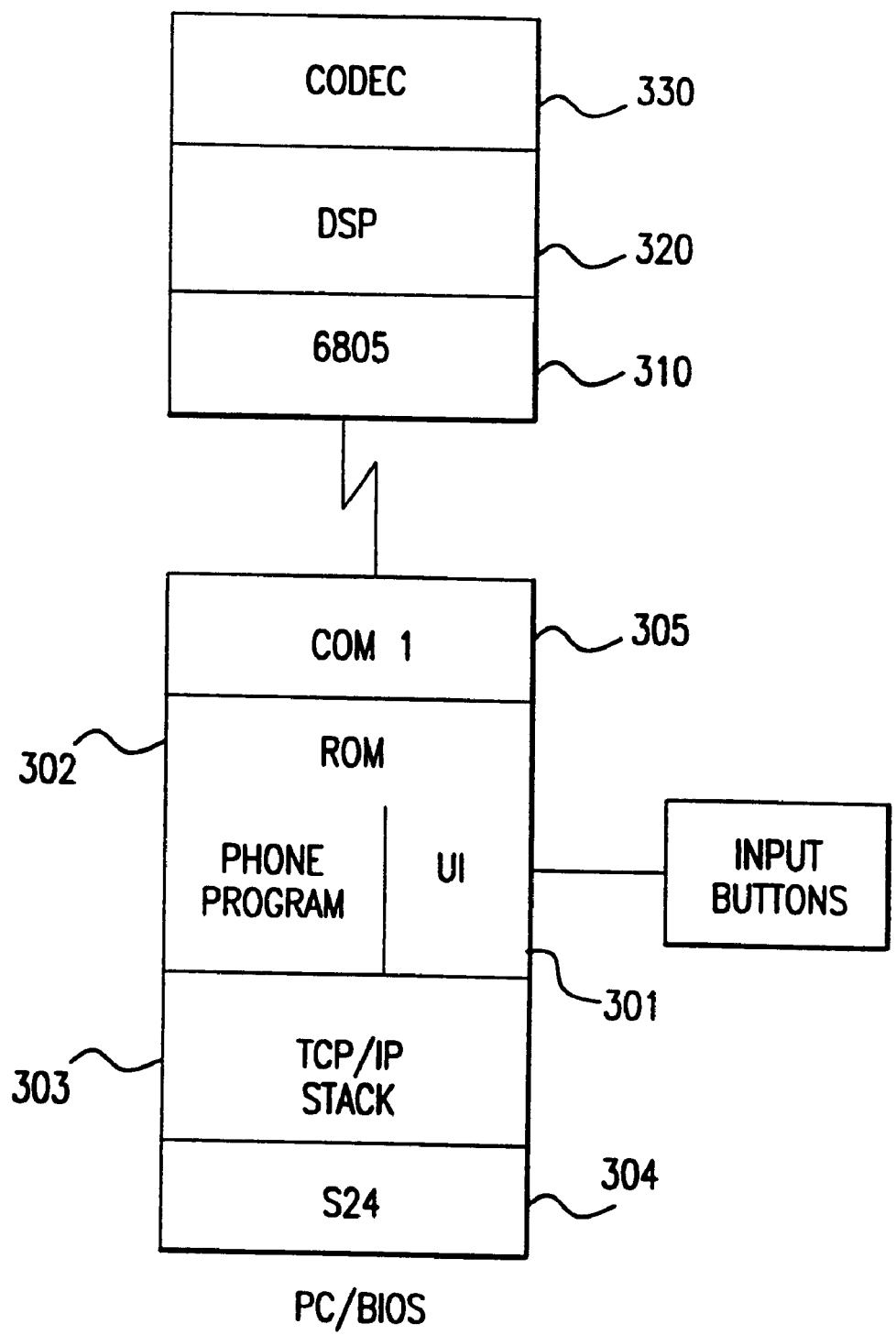
FIGS. 8A and 8B are general functional block diagrams of alternative preferred embodiments of a telephony system used in a portable terminal of the present invention.

Illustrated in FIG. 8A is a block diagram of a preferred embodiment of a telephony system employed in a terminal of the present invention. In FIG. 8A, a PCM CODEC (coder/decoder) chip 330 is connected to a CT8015 DSP (digital signal processor) chip 320 and a 6805 processor chip 310. This chip set is connected to a communication part of the terminal which is provided with a data input user interface 301, and a phone program 302 stored in read only memory. The phone program utilizes a TCP/IP or other protocol stack 303 which communicates packet switched data over a SPECTRUM24® radio PCMCIA card 304. The audio input and output are configured to be placed next to the user's ear and mouth similar to a standard telephone handset and to provide an echo, so that a user can hear what he is saying when he speaks into the microphone. This configuration is preferred in any system in which the terminal is being held up to the user's head for use, such as that shown in FIG. 4.

The 6805 processor chip 310 sends and receives packets of data between the CT8015 DSP chip 320 and the serial port 305. The user interface software is designed to identify the selection of an IP address on the display. Alternatively, the user interface 301 could simply send a telephony request message and wait for a "telephone communication channel open" command to be received from the controller over the wireless communication link.

The phone program is a memory resident (TSR) program and handles the actual processing of audio communication which includes processing user interface data, routing the packets from and to the SPECTRUM24® network, and routing packets from and to the local CT8015 chip. The phone program 302 also performs the handshaking procedure with the CT8015 chip 320.

Figure 8B:
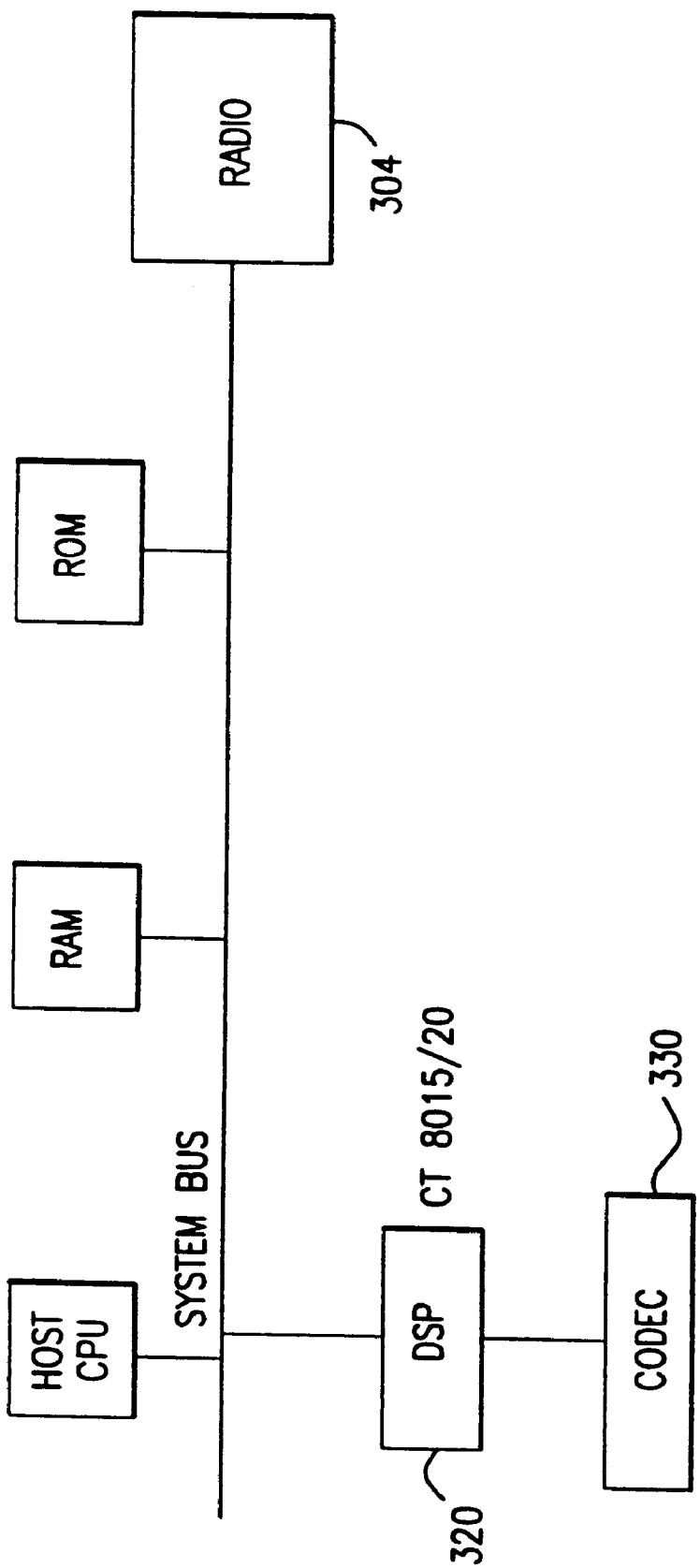

Illustrated in FIG. 8B is an alternative preferred embodiment of the architecture which may be used in a device of the present invention to effectuate telephony application. The architecture illustrated in FIG. 8A is preferred in systems wherein the telephony application is to be added through com port com 1. The architecture illustrated in FIG. 8B is preferred in systems in which the application is to be built as an integral part of the system architecture.

The Phone

Figure 9A:
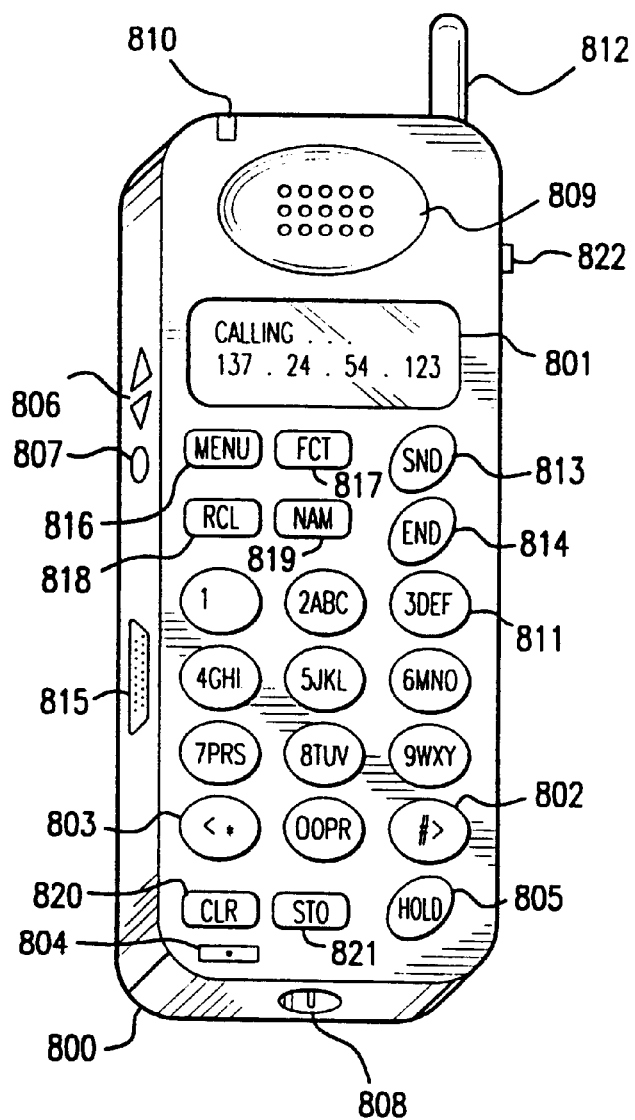
FIG. 9A is a preferred embodiment of a preferred wireless phone used in the present invention.

FIG. 9A shows a preferred embodiment of the present invention in which the MU is a wireless digital phone 800. The phone 800 is provided with a liquid crystal display ("LCD") 801 that displays messages, caller IDs, data and commands entered by the user and a twelve button key pad for entering phone numbers and data. An earpiece 809 and a microphone 804 are used for voice communication. In a preferred embodiment of the phone 800, a port 822 is provided for connecting a headset and microphone to allow the user to view the LCD 801 and operate the key pad 811 while talking on the phone 800. A volume control button 806 permits the user to control the volume for voice communications and the button can also be configured as an alternate scroll. Data is entered using the key pad 811 and as the data is entered, it is displayed on the screen 801. When the screen 801 is full, depressing the enter button 807 saves the data in the phone's memory until it is transmitted by depressing the send button 813. This allows multiple screens of data to be sent in a single transmission. In addition, the phone 800 is provided with an LED ("light emitting diode") indicator 810 which flashes to indicate that a call or a message is being received. The phone 800 is also provided with multiple audio annunciations, including various rings and tones, and can be programmed to vibrate to announce a call or message. The phone 800 can be hardwired to a host device, such as a cash register or a PC, or an antenna 812 can be used for radio communication. When the wireless embodiment of the phone is used, the phone 800 is provided with a connection 808 for recharging the battery in the phone 800.

The phone 800 provides access to a voice and data network through access points connected to a HIU or directly to an Ethernet or Token Ring Network. The phone 800 connects to devices on the network using their network ID or IP addresses. The phone is provided with a RS232 serial port 815 that can be used for a plurality of functions, including as an alternative user interface via a VT100 compatible terminal interface. When the phone 800 is being used as part of an embedded system, the serial port feature allows other devices or computer systems to control the phone's user interface. The serial port 815 can also be used as a serial client bridge, concurrently with its use as a telephone. The user may connect a peripheral device to the serial port 815 to access the wireless network. The serial port 815 supports both stream and packet modes for the serial client bridge, including data link, TCP, UDP, and Telnet support. When the serial port 815 is used as a serial client bridge, the system can be reconfigured via either the phone 800, the user interface or the serial command language of the serial client bridge.

A preferred embodiment of the phone 800 has a plurality of dialing modes, including partial network ID or IP address, last number redial, speed dial and by name using voice recognition. The phone 800 is also provided with caller ID so that the phone number and name of a caller and his location are displayed on the LCD 801. Another preferred embodiment of the phone 800 is provided with an intercom mode that can be programmed to broadcast a message over the entire network or to a plurality of designated addresses. The phone 800 also has a "call waiting" feature that allows the user to switch between two concurrent calls. The phone 800 complies with standards for digital radio transmission, including ITU H.323, IEEE 802.11, Truespeech 8.3 and G.711.

The phone 800 illustrated in FIG. 9A comprises a key pad 811 consisting of standard phone keys (0–9, *, #) and a LCD screen 801. These keys generate dual tone multiple frequency ("DTMF") tones when pressed and can be used for dialing and other special tasks. A function ("FCT") button 817 is used in combination with the key pad 811 to select a particular function. A "MENU" button 816 is used to access the phone's Menu mode which includes pager operation and system configuration functions. A recall ("RCL") button 818 is used to recall the last number used and when this key is pressed repeatedly, the phone 800 cycles through each of the last 10 numbers dialed. When the send ("SND") button 813 is pressed, the currently selected number is used to make the call. When the "RCL" button 818 is pressed followed by a number from 00–99 (i.e., two digits), a speed dial entry corresponding to the two digits is displayed on the LCD 801. The user then presses the "SND" button 813 to initiate a call.

A name ("NAM") button 819 is used to access the phone's name dialing feature. When the "NAM" button 819 is pressed, the LCD 801 shows a list of names listed alphabetically. The user can scroll through the names using either the scroll buttons 806 or the scroll keys included in the "*" button 803 and the "#" button 802. The user may skip to names starting with other letters by pressing the "NAM" button 819 followed by a number key 0–9 on the key pad 811. The LCD 801 displays the names beginning with the letters associated with the numeric key (i.e., pressing "6" will list names that begin with the letters M, N, and O).

A send ("SND") button 813 is used to terminate the dialing sequence and begin the call processing setup. The "SND" button 813 can also be used to accept incoming calls or as a "flash" signal when calls are already established. In addition, if the "SND" button 813 is held down for more than 2 seconds after the phone 800 is powered off, it causes the phone 800 to be powered on. An "END" button 814 is used to terminate calls and to refuse incoming calls. Holding the "END" button 814 down for more than 2 seconds, causes the phone 800 to be powered off A "HOLD" button 805 places the current call on hold and allows a second call to be made or received. The "HOLD" button 805 is also used to switch between two calls. A clear ("CLR") button 820 is used to correct dialing and other input errors. Pressing this button deletes the last character entered. If the "CLR" button 820 is held down for more than 2 seconds, the entire entry is cleared. A store ("STO") button 821 is used to store numbers that are either entered using the key pad 811 or are displayed on the LCD 801 by pressing the "RCL" 818 button. The user can also dial a number and then press the "STO" button 821 followed by two digits (to assign a speed dial address) to add the number to the speed dial index. In addition, if the "STO" button 821 is pressed (along with 2 digits) when the user is connected to a caller, the number of the connected party is stored in the speed dial index. The format of the stored number is either an IP address or an extension, depending on how the connecting party may be reached.

The phone 800 is provided with a pair of Up/Down Scroll buttons 806 which are used to scroll through various lists and menus that are displayed on the LCD 801. These buttons are also used to control the volume for existing calls. A select button 807 is used to select a particular item on the LCD 801, such as items on a menu or names from a list.

Although the phone 800 is primarily addressed by its IP address, it may have additional addresses that are mapped to the IP address. This mapping can be done in the phone's processor or in a HIU. The mapping of additional addresses is done for a variety of reasons ranging from the need to address the phone 800 from a PBX or other remote location, to the convenience of the user. The starting point for addressing a phone 800 is that each phone 800 has a unique IP address that is configured into the phone 800 as part of the setup sequence. It also has an IP subnet mask and a default gateway address. The IP address, together with the MAC address, are the "real" addresses for the phone 800 in that the connection management protocols (as defined in International Telecommunications Standard ("ITU") H.323) are based on IP addresses. The IP address alone is not sufficient to connect the phone 800 to either an outside POTS system and/or a PBX. The phone 800 requires an "extension" address in order for it to be addressed by non IP phones. This extension address can range from one to five digits and is usually the least significant portion of a conventional seven or ten digit phone number. Similarly, an extension address is required by the IP phone 800 in order for it to connect to these non IP phones.

Each phone 800 has an extension number which can be mapped to IP addresses and correspond to other IP phones. Other extension numbers are the "real" address of a non IP phone on a PBX. The number of digits in an extension is a constant for all phones and is set on a site specific basis. The mapping from extension to either IP address or PBX line is also site specific and is the same for all phones. The mapping is downloaded to each phone 800 and stored in the phone's flash memory. When dialing an extension, the mapping will be transparent to the user. A Gateway between a PBX (or POTS) and the IP phone system contains the same mapping of extensions to IP addresses.

In addition to extensions, the system also maps "Names" to either an IP address or an extension. A name can be a sequence of up to sixteen ASCII characters. These names are mapped to either an extension or an IP address. This mapping is global on a site specific basis and is downloaded into each phone 800 and stored in the phone's flash memory. The names are sorted in alphabetical order and the mapping is transparent to the user. Like extensions, Names are an optional feature and are not required for IP phone operation. Phone users can use full or partial IP addresses or extensions instead of Name mapping.

The phone 800 is provided with a locally defined "speed dial" mechanism. The phone 800 can hold up to one hundred "two digit" speed dial numbers which are programmed by the user. Each number is mapped to up to twenty characters that are stored in the phone's memory as a text string. The speed dial mappings are local to each phone 800 and may be altered at any time by the user.

The phone 800 supports a variety of dialing mechanisms. These include: direct entry of complete IP addresses, direct entry of partial IP addresses, direct entry of an "extension," "speed dial" operation, redial of previous number, the use of "names" that are internally mapped to an IP address, and "9" to access an outside line. The dialing process begins by pressing any of the dialing related buttons, including: the "*" button 803 or "#" button 802, the recall ("RCL") button 818, either of the scroll keys 806, or the "NAM" button 819. If the first key pressed is a numeric key (0–9), the phone 800 assumes an extension is being dialed. The user enters the appropriate number of keys to identify the extension as defined by the site administrator. The number is displayed on the LCD 801. Errors may be removed by the "CLR" button 820. As each key is pressed, the corresponding DTMF tone is generated. The call setup process is started by pressing the "SND" button 813. The dialing process can be terminated at any time by pressing the "END" button 814.

If the first key pressed is the "*" button 803, the phone 800 assumes an IP address is being entered. The user can enter a partial or complete IP address using the A.B.C.D format in which the values A, B, etc. are from 0 to 255 decimal. The "dots" are entered via the "*" button 803. Errors are corrected via the "CLR" button 820. The address is displayed on the LCD 801. No DTMF tones are generated although a "click" will be generated with each key pressed. If an illegal address is entered, a "beep" will be generated. Address value checking is performed on each three digit sequence (i.e. the values between each dot). Addresses are terminated and the call setup process initiated by pressing the "SND" button 813. If a partial IP address is entered (i.e. values with fewer than 4 "dots"), the phone 800 fills in the remaining portion of the IP address using its own IP address. The "filling in" is done in groups of 8 bits. Thus, if the user presses the "*" button 803 followed by one to three digits (which has a value which is referred to as "X" and can be between 0–255) and then presses the "SND" button 813, the resulting address is A.B.C.X, where A.B.C come from the phone's own IP address. Likewise if the user enters *X*Y and then presses the "SND" button 813, the resulting address is A.B.X.Y.

If the first key pressed is the "RCL" button 818, the last number dialed is displayed on the LCD screen 801 (essentially a "redial" command). When the user presses the "SND" button 813, the call setup process is started. When the user presses the "RCL" button 818 repeatedly, the phone 800 cycles through each of the last ten numbers dialed. The phone 800 stores the address of each call made in a LIFO queue structure and the user can use the "RCL" button 818 to access this queue. When the desired number is found, the user presses the "SND" button 813 to initiate the call setup process. If the user does not want to use any of the numbers in the LIFO queue, pressing the "END" button 814 resets the phone 800 to the predialing state.

Pressing the "MENU" button 816, the "NAM[E]" button 819, or other similar buttons places the phone 800 in the corresponding mode. If the user presses the "RCL" button 818 and then enters one or two digits, the corresponding speed dial entry will be fetched and displayed on the LCD 801. The user may scroll the speed dial values up and down via the scroll buttons 806. The selection by the user of one of the numbers listed either via the "SND" button 813 or the select button 807 initiates the call setup process.

If the "NAM[E]" button 819 is pressed, a list of names are displayed on the LCD 801 in alphabetical order. The user may scroll through the names using the scroll keys 806 or by pressing the "FCT" button 817 plus either the "*" button 803 or the "#" button 802. The user may "jump" to names beginning with another letter by pressing a numeric key after pressing the "NAM[E]" button 819. Each numeric key has a set of characters associated with it. The names displayed are those that begin with the first letter associated with the numeric key. For example, pressing the number "7" key results in names beginning with the letter "P." The user can then scroll up or down to arrive at the desired name. Alternatively, when the user presses another numeric key, the names corresponding to the first letter associated with that key are displayed. Pressing the same numeric key repeatedly results in a cycling of names beginning with the letters associated with that key. For example, pressing "7" after the "NAM" button 819 results in names starting with "P" being displayed. When "7" is pressed again, names starting with "R" are displayed. When pressed again, names with the letter "S" are displayed. When pressed a fourth time, names starting with "P" are displayed again. When the desired name is found, the user can press either the select button 807 and/or the "SND" button 813. When the select button 807 is pressed, the selected name and IP address are displayed. When the "SND" button 813 is pressed (either with or without first pressing the select button 807), call setup processing is initiated. The name process can also be started by pressing either of the scroll buttons 806.

When the first key pressed is a "9", the phone 800 connects to an outside line (i.e., a POTS line). The user then enters a standard telephone number. After a dial tone is received, the user can dial a phone number using the DTMF tones generated by the phone's keys 811. In all cases, the user can terminate the dialing sequence at any time by pressing the "END" button 814.

The phone 800 supports several different call receiving modes which determine how calls are accepted (or refused). These modes include: "auto answer," "single key answer/refuse" and "any key answer." Whenever a call is received, the user is notified by a choice of ringing tones and the address/name of the calling party displayed on the LCD 801. The user may refuse the call by pressing the "END" button 814. From the caller's perspective, it appears that the call is simply not being answered.

The user may configure the phone 800 for the different call receiving modes. The "auto answer mode" answers the call after a single ring without any user action. The call is immediately connected. The "single key answer" mode requires the user to press the "SND" button 813 to accept a call. Pressing any other button (except the "END" button 814) has no effect. The "any key answer" mode allows the user to press any key to accept a call (except the "END" button 814). If a headphone is used and the phone 800 is attached to a belt, this mode allows the user to just touch the phone 800 to answer a call.

The phone 800 can support two concurrent conversations. The user switches between the two calls using the "HOLD" button 805. When the hold feature is used, the phone 800 operates like "call waiting" on a conventional phone but with a few additional features. The user typically has one call established. A second incoming call is indicated via a tone sent to the earpiece 809. At that point, the user presses the "HOLD" key 805 and switches to the second call. The caller is identified to the user via the LCD 801 and the user can either accept or refuse the call via the "SND" button 813 or "END" button 814. If the call is accepted, the second call is connected and the first call is put on hold. The user can switch back and forth between the two calls using the "HOLD" button 805. Alternatively, the user can place an existing call on hold by pressing the "HOLD" button 805 and initiate a second call without terminating the first call. Each call is independent from the other call and the status of each call is displayed on the LCD 801. The call that is on hold receives a regular "beep" to indicate to the caller that he is still connected. In a preferred embodiment, prerecorded music can be sent to the user on hold. A phone 800 can support multiple conversations among IP phones and two concurrent calls when one of the calls is through a PBX or POTS line.

The phone 800 can be used for broadcast (or intercom) style communications. In this mode, a user can "broadcast" a message to any number of other phones. The incoming message is delivered immediately to each user without the need for the user receiving the message to answer the call. Each phone 800 can be configured either to receive a broadcast message and preempt current calls or to prevent the broadcast message from interrupting a call. Broadcasts can be limited to designated phones or subsets of phones by the sender in order to minimize interruptions to parties who are not interested in the broadcast message. There are eight channels available for broadcast messages and each phone 800 can be configured to accept messages on any number (including zero) of these "channels." Messages broadcast on channels that have not been selected, are silently discarded.

Users can respond to broadcasts in several different ways. First, the user can listen to a message and take no further action. Second, the user can call the person making the call. This can be done by conventional dialing or via the "FCT" button 817. Third, the user can make a "broadcast reply" using the basic broadcast mechanism. After receiving a broadcast message, the broadcast channel becomes the phone's default channel for five seconds to allow the user to easily reply to the broadcast message.

The phone 800 supports a number of special functions that are accessible via the "FCT" button 817. Functions are transient operations and include infrequently used tasks for which a key would be allocated if more keys were available. The commands entered using the "FCT" button 817 do not effect the permanent configuration of the phone 800. When the user presses the "FCT" button 817, the list of available functions are displayed on the LCD 801. The user may either scroll through the list and select a function using the UP/DOWN buttons 802 and 803 and select button 807 or enter the function code via the numeric keys 811. The phone 800 can support standard functions, as well as user specified functions. These functions include: broadcast mode, broadcast call back, call transfer, ring tone volume/type, volume level, answer mode, battery status, network status and enter pager mode.

The "MENU" button 816 is used to access pager functions and to configure the phone 800. When the "Menu" button 816 is pressed, the LCD 801 displays a set of menus which can be used to send and display page messages, configure the phone's network parameters, perform diagnostics, examine statistics, etc. When in the Menu mode, the phone 800 accepts calls. If the user "answers" the call, the phone 800 exits the menu mode. The user may disable incoming calls entirely via the "FCT" button 817. Some of the parameters that may be configured from the Menu mode include: IP addressing, IP address, subnet mask, default gateway, wireless LAN parameters, Net ID (i.e., the extended service set—"ESS"), and preferred application programming interface ("API" or basic service set—"BSS").

The Menu mode can also be used to set the volume and type of ring tone. Ring types include: audio (with various styles of ring), vibrator motor, and flashing screen. The Menu mode is also used to control the answer mode of the phone 800 (i.e. auto, single key, any key), disable call reception, edit the speed dial list, and specify the channels on the phone 800 that are capable of receiving broadcast messages and the default outgoing channel.

The phone 800 can also support a Telnet mode of operation in which a user signs onto a remote system network directly as a user of that system. Telnet TCP/IP is the standard Internet protocol for remote terminal connectivity. In this mode of operation, the user establishes a Telnet connection to a host machine and uses the phone 800 as a Telnet terminal. The keys 811 are mapped to a restricted subset of the normal keys of a Telnet VT100 compatible terminal. When the Telnet mode is active, the phone 800 is limited to one active phone call at a time. However, the user can switches back and forth between the voice and data modes via the "HOLD" key, much the same way as switching between two phone calls.

Figure 9B:
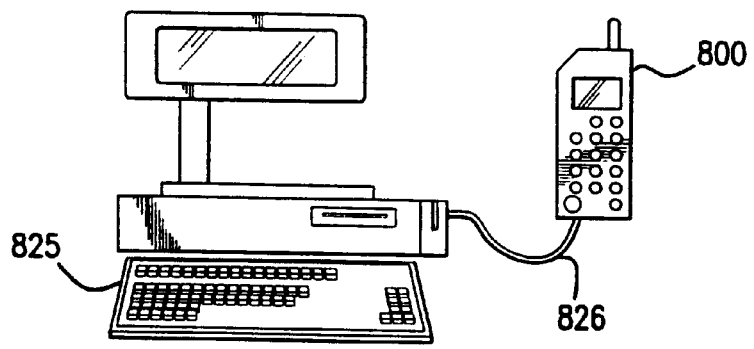
FIG. 9B is a preferred embodiment of a cash register and digital phone.

FIG. 9B shows a preferred embodiment of the present invention in which the phone 800 is connected to a cash register 825 by a cable 826. In an alternative embodiment, the phone 800 is a wireless phone and it communicates with the register 825 by digital radio communication. The register 825 can also be provided with a bar code scanner. The register 825 and phone 800 share the same radio for communication of voice and data between the register 825 and a HIU or PBX.

Figure 10A:
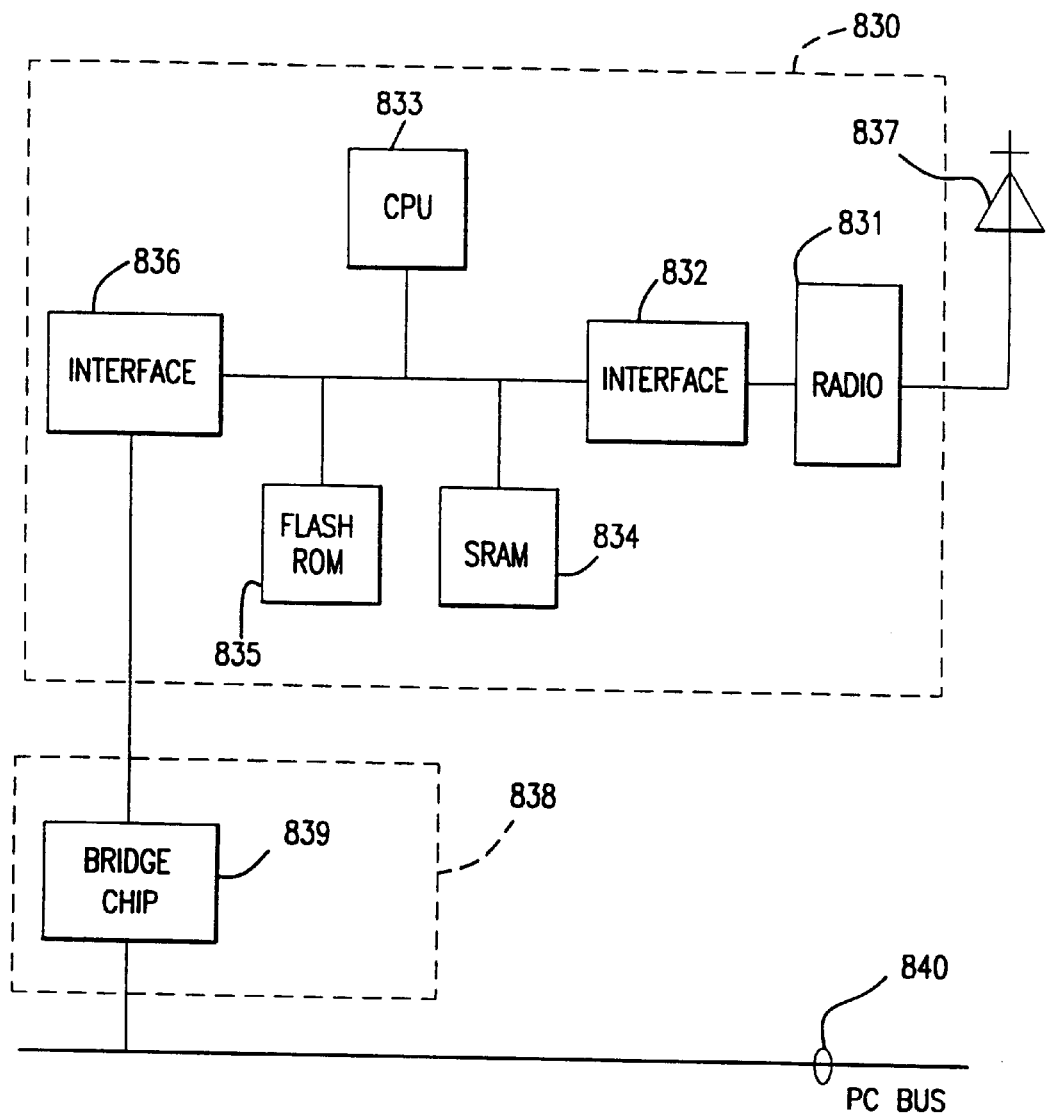

FIG. 10A illustrates a block diagram of a radio card 830 that is used as an AP for connecting a plurality of radio signals to a host device. The radio card comprises radio circuits 831 for a frequency hopping spread spectrum radio, interface circuits 832 to interface the radio circuits 831 with the other components on the card 830, a central processing unit ("CPU") 833, flash read only memory ("ROM") 835, static random-access memory ("SRAM") 834 and PCMCIA interface circuits 836 that also provide power management support and system integration functions. An ISA ("Industry Standard Architecture") card 838 plugs into a host device and comprises a bridge chip 839 that interfaces the radio card 830 with the bus 840 of the host device. The radio card 830 also has a connection for an antenna 837. The antenna 837 can be mounted on the radio card 830 or it can be connected to the host device's internal or external antenna. The radio card 830 can be mounted on the ISA card 838 or it can be connected to the host device's PCMCIA port.

Figure 10B:
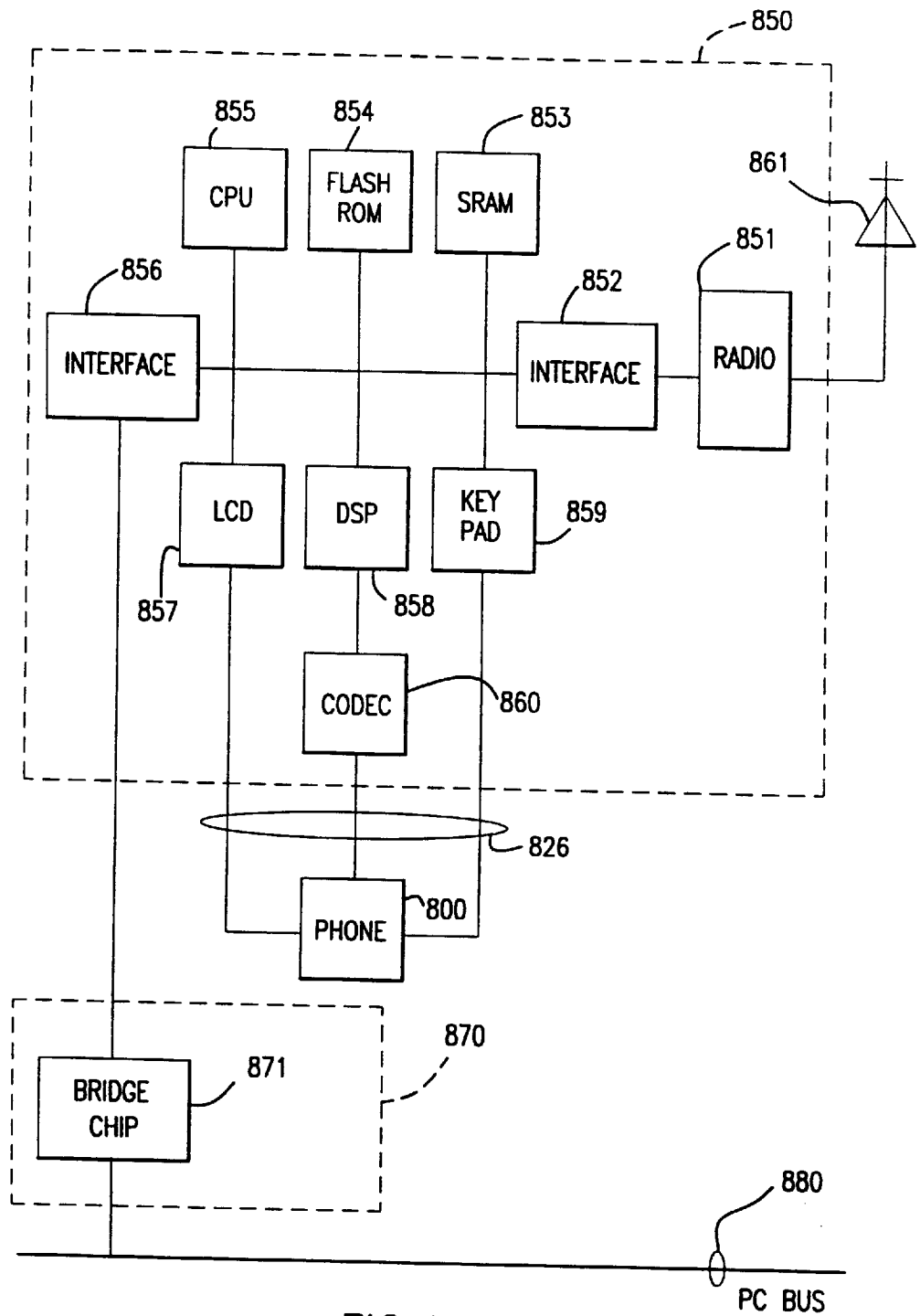

FIG. 10B illustrates a block diagram of the embodiment of the invention depicted in FIG. 9B, wherein the phone 800 is connected to a host device 825 by a hard wired connection 826. The radio card 850 is located in the host device and comprises radio circuits 851, a radio interface 852, SCRAM 853, flash ROM 854, a CPU 855 and a PCMCIA interface 856. The radio card 850 also has circuitry for supporting the phone 800. This circuitry comprises a digital signal processor ("DSP") 858 and a coder/decoder ("CODEC") 860, as well as circuits for the phone's LCD 857 and key pad 859. The DSP 858 provides a means for processing voice communications and the CODEC 860 provides a means for coding and decoding voice communications. The radio card 850 connects through a bridge chip 871 to the bus 880 of the host device.

Voice communications are processed and coded/decoded in the radio card 850 and transmitted over the radio as digital packets in accordance with ITU Standard H.323, which is hereby incorporated by reference. These digital packets of information are used to communicate with third party servers employing standard TCP/IP and other standardized communication protocols to transmit/retrieve data. This allows the phone user to communicate over the Internet and it also allows the phone user to access sites on the Internet.

Figure 10C:
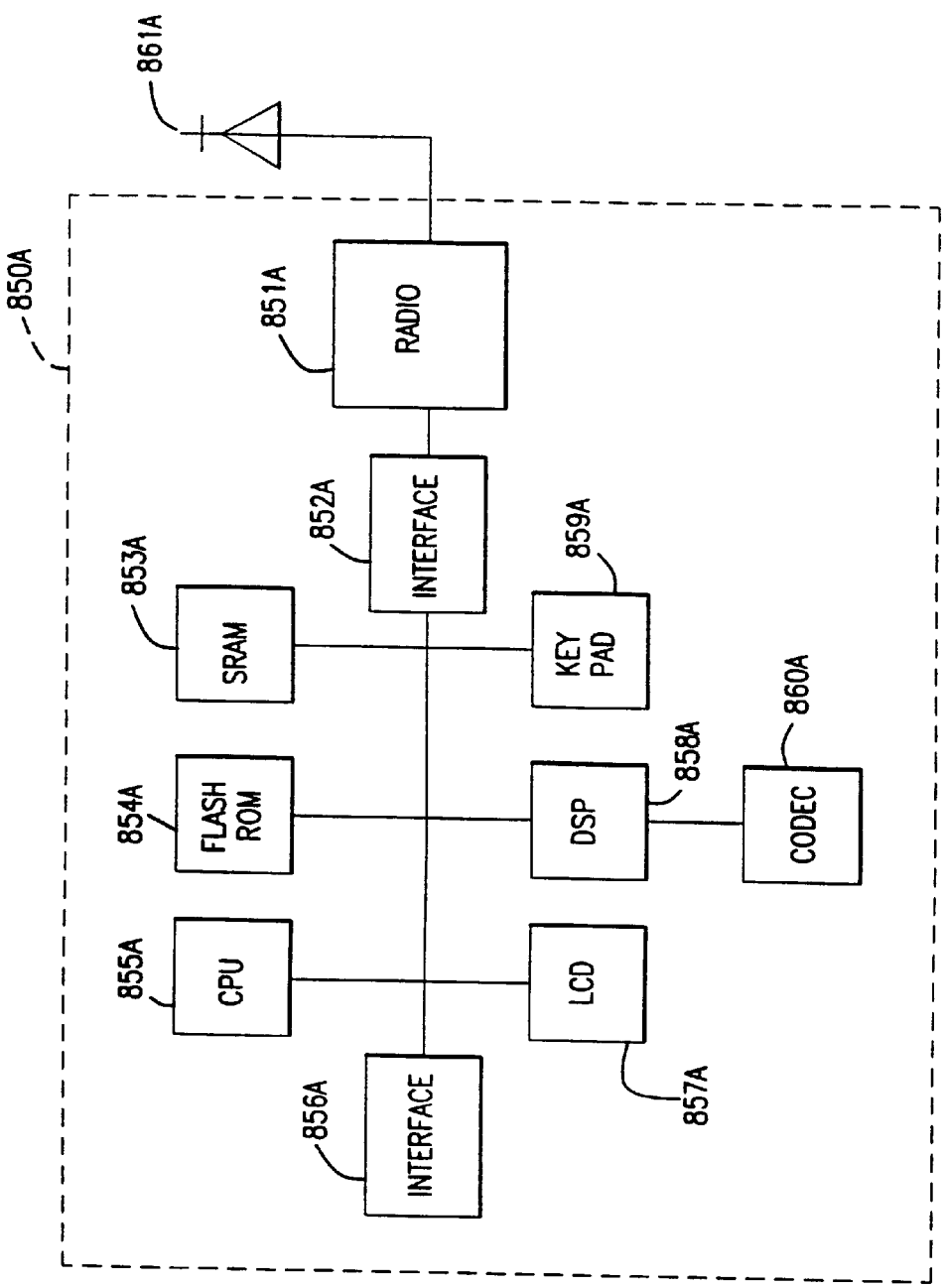

FIG. 10C illustrates a block diagram of a preferred embodiment, in which the phone is a wireless phone comprising a radio card 850A housed inside the phone. The phone communicates by radio with a radio in a host device, such as the radio shown in FIG. 10A. The host device is a computer that can also support other functions, such as a bar code scanner. The host device communicates with a HIU by radio communication or it can be connected to the HIU by a network, such as an Ethernet or Token Ring network. The network can communicate with remote devices by telephone, either through a PBX connected to the network or by a Central Office line connected to the HIU. The phone user can access the network or an outside telephone line through the host device for voice and data communications.

Figure 11A:
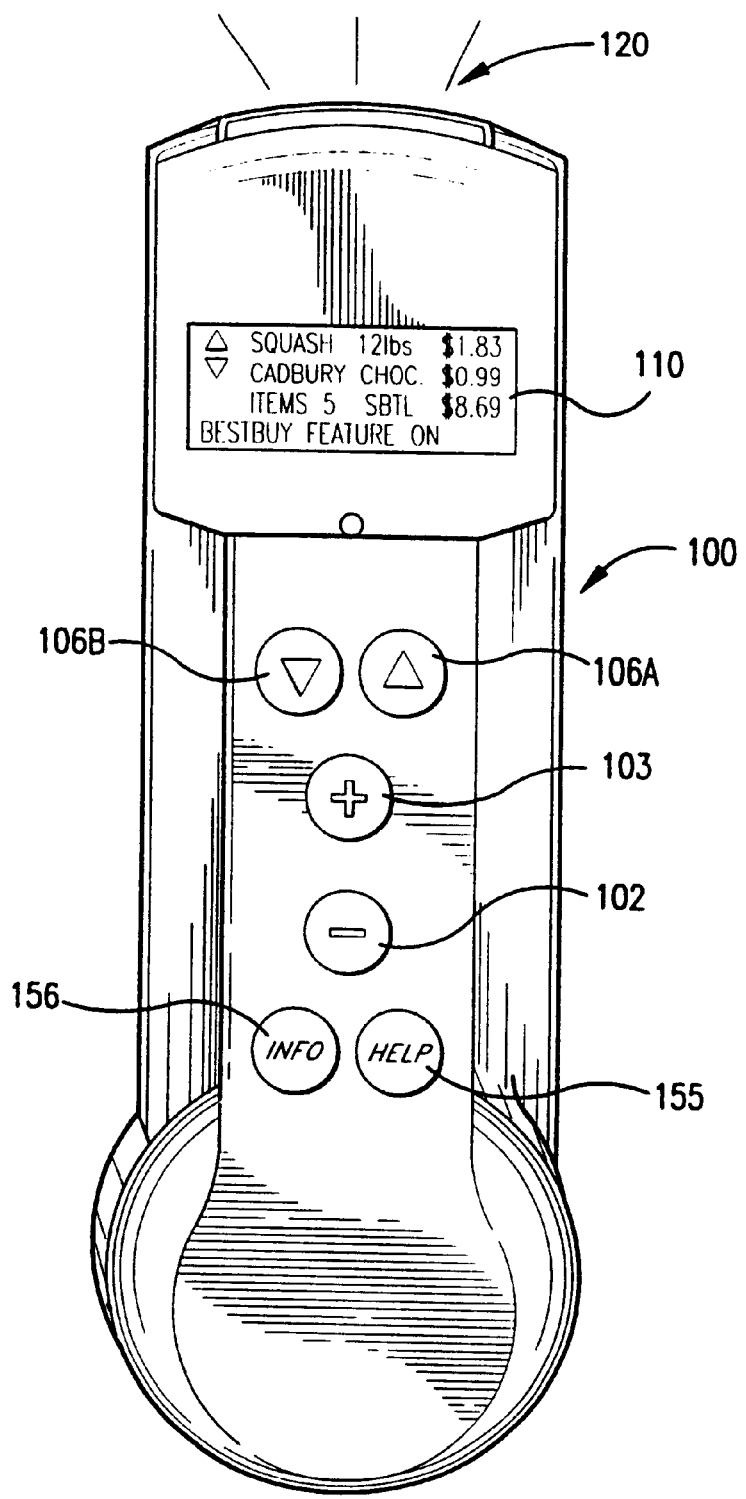
FIG. 11 is an alternative preferred embodiment of the present invention used in a self-scanning application.

Another preferred embodiment of the MU for the present invention is illustrated in FIG. 11A. The scanner 120 is provided with a display 110, a plus key 103, a minus key 102 and two scrolling keys 106A and 106B. The terminal is also provided with an information key 156 and a help key 155.

Figure 11B:
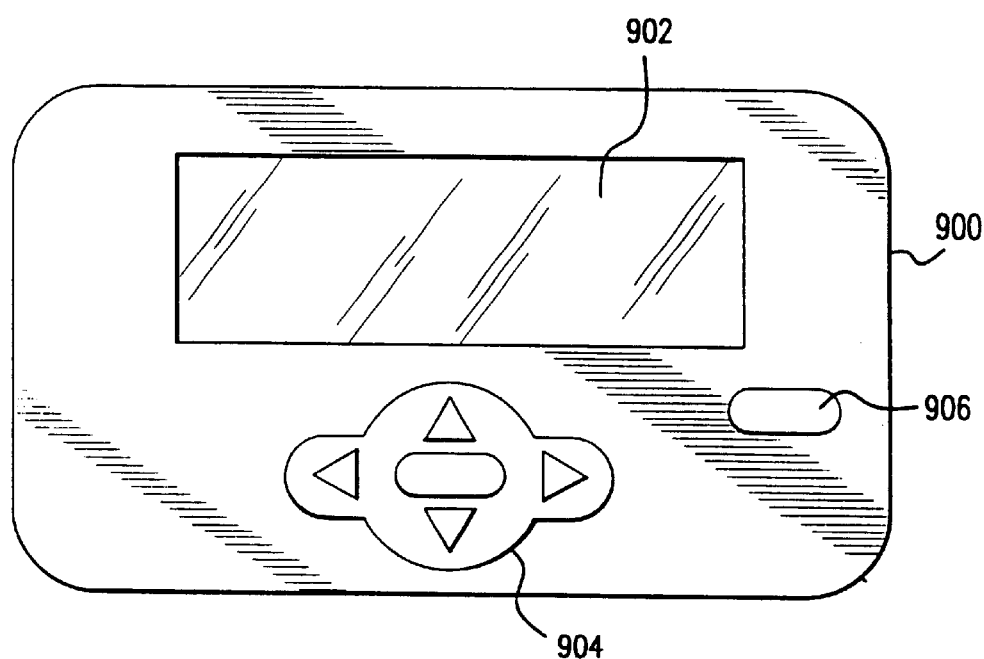

The information key can be employed to provide information on a displayed item and the help key can be used to provide user assistance in the form of data displayed on the display. When the terminal is provided with voice functions, additional keys can be added for specific voice messaging functions and the help key can automatically open a line of audio communication with an operator at a remote location FIG. 11B illustrates the preferred embodiment of the pager 900 for the present invention. The pager 900 comprises a digital radio (FIG. 10C illustrates a block diagram of the pager's radio) and connects to a LAN through an AP and provides one- or two-way paging. Messages are displayed on a LCD 902 with the time and date stamped and the messages can be permanently saved in the pager's memory. The user is alerted to messages by buzzer or vibrator annunciation. The pager 900 can be connected to a HIU for communication within a LAN and it can also communicate with remote devices when the HIU is connected to a PBX by an Ethernet or Token Ring Network or Central Office telephone line. The user can respond to messages using a menu of programmed responses in the memory of the pager 900. The user scrolls through the menu and selects the response that he wishes to send and then transmits the response. The pager 900 is also provided with Internet paging capabilities and can be configured to display a message when e-mail is received on a PC connected to the network.

In a preferred embodiment, the pager is provided with a 5-way button 904 for reading, reviewing, deleting, forwarding and editing messages. The 5-way button 904 has four positions that can be used to scroll a cursor up/down or left/right and select items displayed on the LCD 902. The selected information can then be transmitted in response to a message or to originate a message using the fifth position of the 5-way button 904. An on/off button 906 allows the user to turn the pager 900 off when it is not in use. The pager 900 can access the voice mail features of a PBX or computer and display the messages on the LCD 902. The pager 900 can then save these messages or forward them to other user's or a data storage device, such as his PC or a server on the network. The pager is also provided with a multi-tone caller ID to distinguish different priority level calls and different callers. A separate tone can also be designate to distinguish phone massages from faxes and e-mail.

In another preferred embodiment, the system automatically creates a linked page for scanned items including any associated information matching a user's preference profile. The system will employ a dynamic page builder using a predetermined template wherein a hyperlink to a page of data is presented. In the event the page exceeds the display limitations of the display (i.e., requires more lines than are available on a single display) for the terminal in use, the page builder automatically creates a new "next page" link to be displayed on the terminal. The dynamic page builder program also permits an override function in the event a link is provided to an external web page address. Using the network ID or IP address of the portable terminal, the HIU will retrieve the file from a device on the network or from a remote site via the PBX (for example, an Internet server) and send the information to the portable terminal. The information sent by the HIU will include any reformatting constraints that are applicable to the destination portable terminal which may only have a partial view screen capability. A command can be entered on the portable terminal to move the resulting collection of data to a designated location, such as a PC in the user's office or by e-mail transmission. If the MU is a PC, he data can also be saved on a data collection article such as a smart-card or a floppy disk.

In a preferred embodiment of the present invention, the HIU also provides for the uploading of data to remote devices from a MU. Thus, a user may send data generated using the MU or stored on a PC or server connected to the network to a remote location via the PBX. The user can also sign onto the Internet from a MU and attach a file to an e-mail message.

In a further embodiment of the present invention, the user can access a PC 34 (FIG. 1) through the HIU, or in the alternative, the HIU makes available a user accessible but password protected web page.

Figure 12:
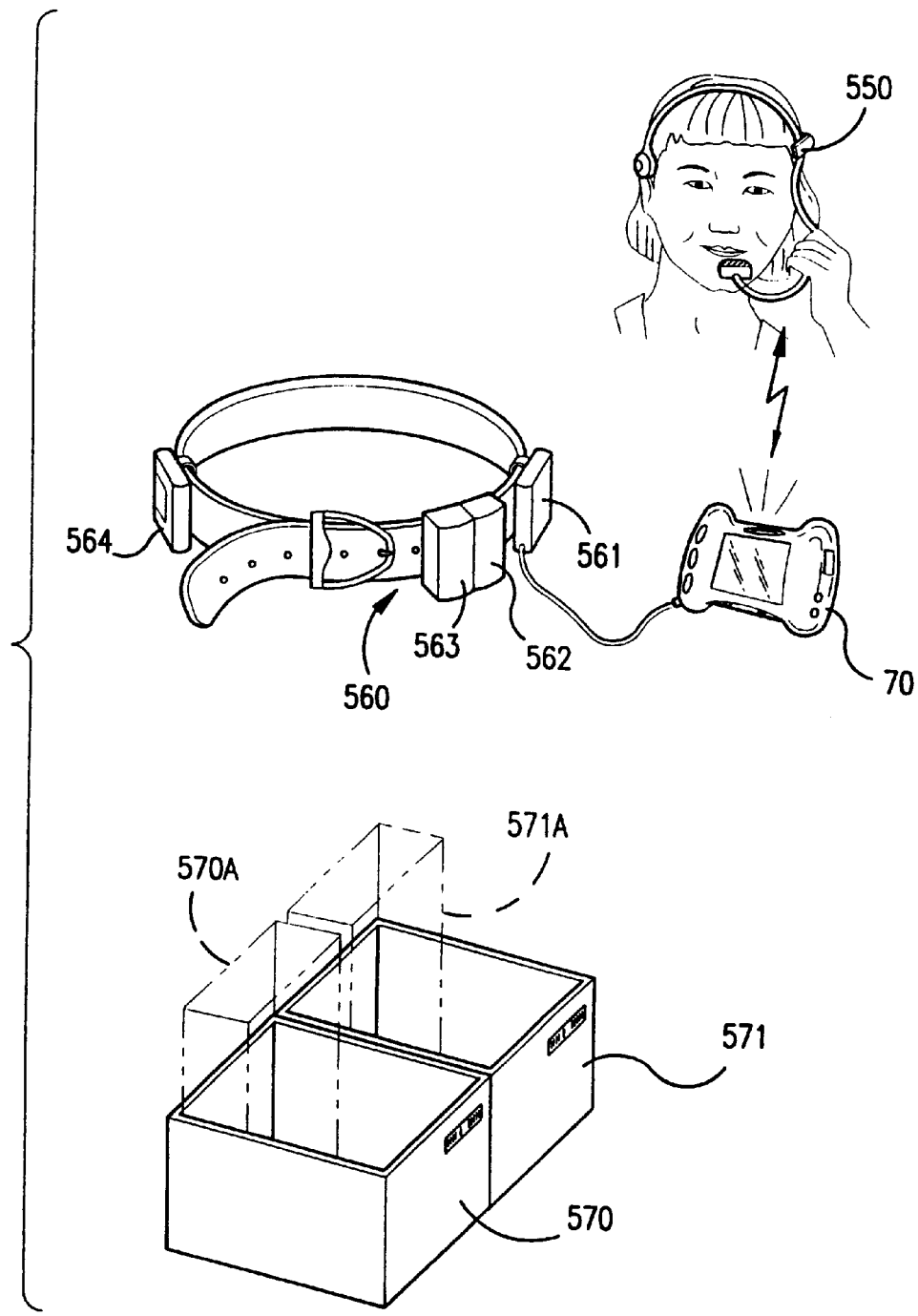
FIG. 12 is an alternative preferred embodiment of a terminal system for use by an attendant in fulfilling customer orders.

FIG. 12 illustrates an alternative preferred embodiment of a system of the present invention in which a voice headset 550 uses a narrow band radio for communicating data to and from the portable terminal 70. When the terminal is used for extended time periods, a wearable battery pack 560 may be provided to supplement the battery of the terminal 70. In an alternative preferred embodiment, the terminal can be a wearable design for ease of use by the attendant. Examples of such a wearable design are illustrated in U.S. Pat. Nos. 5,514,861; 5,250,790; 5,543,610; 5,340,972; 5,191,197; 5,410,140; and 5,416,310; all of which are assigned to the assignee of the current invention.

In another preferred embodiment, an easy to use and light weight bar code scanner is used, as illustrated in FIG. 12. The belt 560 can be provided with all the necessary terminal functions through modular packs 561–564. Battery 561 can be supplemented with a CPU component 562, a radio module 562, memory board 563 and audio/video module 564. These systems would communicate with a headset 550, a wrist-mounted display, and a wireless ring scanner. It is preferred that these components employ a wireless communication data line which permits multi-channel communication to the CPU component 562, and that the belt modules be connected using a flexible cable connector data bus.

The herein described embodiments of the present invention are intended to provide the preferred embodiments of the present invention as currently contemplated by the applicants. It would be obvious to anyone of skill in the relevant art based on the herein described examples without straying from the present invention that numerous modification can be made to the described preferred embodiments. For example, the portable terminal can take any number of forms including wearable solutions available from Symbol Technologies, Inc. and other portable solutions described herein. In addition, the graphical user interface can also be implemented as a number of different presentation schemes. Accordingly, the herein described embodiments are merely exemplary in nature and are not intended to represent every possible embodiment of the present invention.

What is claimed by the invention is:

1. A wireless telephone system, comprising:
   at least one access point for communicating with mobile units using a wireless protocol;
   a plurality of mobile units, each having a network address and a telephone extension address;
   and a telephone service interface connected to said access point and a central office, said interface including a gateway, including a memory mapping said telephone extension addresses of said mobile units and network addresses of said mobile units;
   wherein said mobile units can provide telephone communication with other mobile units using said network addresses, and wherein said mobile units can receive telephone communication from said central office addressed to said telephone extension addresses via said telephone service interface.

2. A wireless telephone system as specified in claim 1 wherein said telephone service interface comprises a PBX.

3. A wireless telephone system as specified in claim 1 wherein said mobile units are arranged to generate DTMF tones and to communicate said DTMF tones to said telephone service interface via said access point to establish a telephone connection to said central office.

4. In a local area network having at least one access point for providing wireless communication to mobile units, and a telephone service interface connected to said access point and a central office, a method of providing telephone service to said mobile units, comprising:

assigning telephone extension numbers and network addresses to said mobile units;

establishing telephone connections using data messages between said mobile units using said network addresses;

providing DTMF signals from said mobile units as data messages to said telephone service interface to establish external telephone connections from said mobile units to said central office; and receiving signals from said central office representing telephone extension numbers and mapping said extension numbers into network addresses to establish telephone connections from said central office to said mobile units.

5. A telephone system, comprising:

a PBX having a gateway for mapping telephone extension numbers to corresponding network addresses;

telephone extensions having extension numbers connected to said PBX;

at least one data communications access point connected to said gateway of said PBX;

and a plurality of mobile units, arranged for radio data communication with said access point and each having a network address corresponding to a telephone extension number;

wherein said PBX receives telephone extension numbers corresponding to said mobile units and establishes a connection to said mobile unit via said access point using said corresponding network address, and wherein said mobile units generate DTMF signals corresponding to an extension number of a telephone extension and provide said DTMF signals as a data message to said PBX via said access point to establish a connection to said telephone extension.

6. A telephone system as specified in claim 4 wherein said mobile units generate DTMF signals corresponding to an external telephone number and provide said DTMF signals to said PBX via said access point to establish a connection to said external telephone number.

7. A telephone system as specified in claim 5 wherein said mobile units communicate with other mobile units via said access point using said network address.

* * * * *

UNITED STATES PATENT AND TRADEMARK OFFICE
CERTIFICATE OF CORRECTION

PATENT NO. : 6,330,244 B1
DATED : December 11, 2001
INVENTOR(S) : Swartz et al.

It is certified that error appears in the above-identified patent and that said Letters Patent is hereby corrected as shown below:

<u>Title page,</u>
Item [76], Inventors: delete "Daniel R. MGlynn, 266 76th St. Brooklyn, NY (US) 11209"

<u>Column 3,</u>
Line 23, replace "FIGS. 10A, 10B, 10C and 10D" with -- FIGS. 10A, 10B and 10C --

Signed and Sealed this

Sixth Day of August, 2002

Attest:

Attesting Officer

JAMES E. ROGAN
*Director of the United States Patent and Trademark Office*